United States Patent
Hong

(10) Patent No.: US 11,343,756 B2
(45) Date of Patent: May 24, 2022

(54) CELL TYPE INDICATION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 31 days.

(21) Appl. No.: 16/938,940

(22) Filed: Jul. 25, 2020

(65) Prior Publication Data

US 2020/0359303 A1 Nov. 12, 2020

Related U.S. Application Data

(63) Continuation of application No. PCT/CN2018/074683, filed on Jan. 31, 2018.

(51) Int. Cl.
| | | |
|---|---|---|
| H04W 48/12 | (2009.01) | |
| H04W 28/02 | (2009.01) | |
| H04W 48/16 | (2009.01) | |
| H04W 48/10 | (2009.01) | |
| H04W 48/20 | (2009.01) | |

(52) U.S. Cl.
CPC ....... *H04W 48/12* (2013.01); *H04W 28/0289* (2013.01); *H04W 48/10* (2013.01); *H04W 48/16* (2013.01); *H04W 48/20* (2013.01)

(58) Field of Classification Search
None
See application file for complete search history.

(56) References Cited

U.S. PATENT DOCUMENTS

| 8,335,188 | B1 | 12/2012 | Harris | |
|---|---|---|---|---|
| 8,537,751 | B2 | 9/2013 | Nylander | |
| 2005/0102703 | A1 | 5/2005 | Querashi | |
| 2008/0227447 | A1* | 9/2008 | Jeong | H04W 48/10 455/434 |
| 2012/0195255 | A1 | 8/2012 | Nylander | |

(Continued)

FOREIGN PATENT DOCUMENTS

| CN | 101584134 A | 11/2009 |
|---|---|---|
| CN | 101873649 A | 10/2010 |

(Continued)

OTHER PUBLICATIONS

First Office Action of the Russian application No. 2020128563, dated Jan. 15, 2021.

(Continued)

*Primary Examiner* — Hong S Cho
(74) *Attorney, Agent, or Firm* — Syncoda LLC; Feng Ma

(57) ABSTRACT

A cell type indication method includes: a cell type of a first cell is determined, the cell type of the first cell including a cell providing dedicated network service for high-speed railway or a cell providing common public network service for Long-Term Evolution (LTE); a system message to be used to indicate the cell type of the first cell is determined; and the system message is sent to a terminal to enable the terminal to determine the cell type of the first cell according to the system message and, in response to determining to access the first cell according to the cell type of the first cell, initiate an access process to the first cell.

7 Claims, 27 Drawing Sheets

(56) References Cited

U.S. PATENT DOCUMENTS

| | | | |
|---|---|---|---|
| 2015/0119101 A1* | 4/2015 | Cui | H04W 48/18 |
| | | | 455/525 |
| 2016/0255564 A1* | 9/2016 | Yang | H04W 4/06 |
| | | | 455/436 |
| 2017/0201925 A1* | 7/2017 | Chong | H04W 60/04 |

FOREIGN PATENT DOCUMENTS

| | | |
|---|---|---|
| CN | 103523056 A | 1/2014 |
| CN | 106134282 A | 11/2016 |
| CN | 106332197 A | 1/2017 |
| CN | 106454715 A | 2/2017 |
| CN | 107332704 A | 11/2017 |
| CN | 107567046 A | 1/2018 |
| JP | 2015507893 A | 3/2015 |
| JP | 2017516363 A | 6/2017 |
| JP | 2018523426 A | 8/2018 |
| RU | 2486701 C2 | 6/2013 |
| WO | 2016137585 A1 | 9/2016 |
| WO | 2017024591 A1 | 2/2017 |

OTHER PUBLICATIONS

International Search Report in the international application No. PCT/CN2018/074683, dated Sep. 19, 2018.

English Translation of the Written Opinion of the International Search Authority in the international application No. PCT/CN2018/074683, dated Sep. 19, 2018.

First Office Action of the Korean application No. 10-2020-7023282, dated May 19, 2021.

Intel Corporation et al: "Cell reselection for the UE on high-speed-dedicated network", 3GPP Draft; R2-1712616, 3rd Generation Partnership Project (3GPP), MobileCompetence Centre; 650, Route Des Lucioles; F-06921 Sophia-Antipolis Cedex France vol. RAN WG2, No. Reno, United State; Nov. 30, 2017-Dec. 3, 2017, XP051371548, paragraph [0002].

CMCC et al: "Solutions for UE camping in high speed railway scenario", 3GPP Draft; R2-1713255 (Revision of R2-1709000) Solutions for UE Camping inHigh Speed Railway Scenario V1.3—CMCCMTK, 3rd Generation Partnership Project (3GPP), Mobi Le Competence Centre; 650, ROUT vol. RAN WG2, No. Reno, Nevada, USA; Nov. 27, 2017-Dec. 1, 2017, XP051372037, paragraph [0002].

Supplementary European Search Report in the European application No. 18903218.8, dated Aug. 2, 2021.

First Office Action of the Chinese application No. 201880000068.6, dated Sep. 30, 2020.

First Office Action of the Japanese application No. 2020-539248, dated Aug. 26, 2021.

* cited by examiner

CELL TYPE INDICATION METHOD AND APPARATUS

CROSS REFERENCE TO RELATED APPLICATION

This is a continuation of International Application No. PCT/CN2018/074683 filed on Jan. 31, 2018, the disclosure of which is hereby incorporated by reference in its entirely.

BACKGROUND

Along with the rapid development of high-speed railway technologies and rapid deployment of high-speed railways, more and more users take high-speed trains to travel. To meet communication requirements of a mobile user taking a high-speed train and ensuring the communication quality of the mobile user taking the high-speed train, operating companies may deploy high-speed-railway dedicated networks to try to serve better such the mobile users.

SUMMARY

The present disclosure generally relates to the technical field of communication, and more particularly, to a cell type indication method and apparatus.

According to a first aspect of the embodiments of the present disclosure, a cell type indication method is provided, which may be applied to a base station managing a first cell and include that:

determining a cell type of the first cell, the cell type of the first cell comprising a cell providing dedicated network service for high-speed railway or a cell providing common public network service for Long-Term Evolution (LTE);

determining a system message to be used to indicate the cell type of the first cell; and sending the system message to a terminal to enable the terminal to determine the cell type of the first cell according to the system message and, in response to determining to access the first cell according to the cell type of the first cell, initiate an access process to the first cell.

According to a second aspect of the embodiments of the present disclosure, a cell type indication method is provided, which may be applied to a terminal and include:

receiving a system message indicating a cell type of a first cell from a base station;

determining the cell type of the first cell according to the system message, the cell type of the first cell comprising a cell providing dedicated network service for high-speed railway or a cell providing common public network service for Long-Term Evolution (LTE); and in response to determining to access the first cell according to the cell type of the first cell, initiating access to the first cell.

According to a third aspect of the embodiments of the present disclosure, a cell type indication device is provided, which may be applied to a base station managing a first cell and include:

a processor; and memory configured to store an instruction executable for the processor, wherein the processor may be configured to:

determine a cell type of the first cell, the cell type of the first cell including a cell providing dedicated network service for high-speed railway or a cell providing common public network service for LTE;

determine a system message to be used to indicate the cell type of the first cell; and send the system message to a terminal to enable the terminal to determine the cell type of the first cell according to the system message and, in response to determining to access the first cell according to the cell type of the first cell, initiate an access process to the first cell.

According to a fourth aspect of the embodiments of the present disclosure, a cell type indication device is provided, which may be applied to a terminal and include:

a processor; and memory configured to store an instruction executable for the processor, wherein the processor may be configured to:

receive a system message indicating a cell type of a first cell from a base station;

determine the cell type of the first cell according to the system message, the cell type of the first cell including a cell providing dedicated network service for high-speed railway or a cell providing common public network service for LTE; and in response to determining to access the first cell according to the cell type of the first cell, initiate an access process to the first cell.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
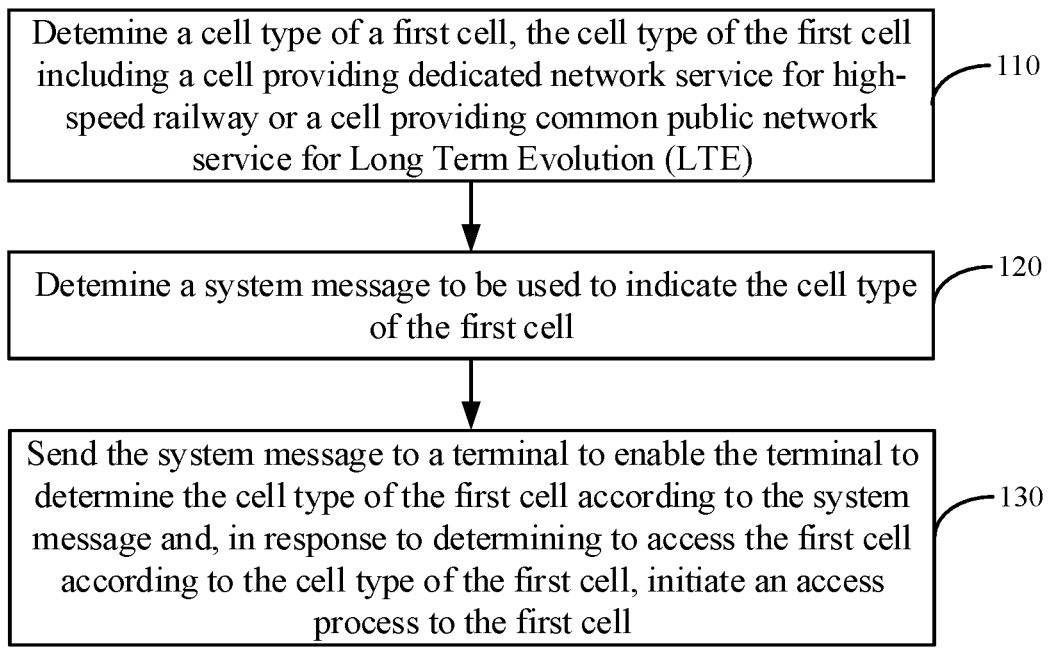
FIG. 1 is a flowchart showing a cell type indication method according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Terms used in the present disclosure are merely adopted for the purpose of describing specific embodiments and not intended to limit the present disclosure. "A/an," "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms first, second, third and the like may be used to describe various information in the present disclosure, the information should not be limited to these terms. These terms are only used to distinguish the information of the same type. For example, without departing from the scope of the present disclosure, indication information may also be called second information and, similarly, second information may also be called indication information. For example, term "if" used here may be explained as "while" or "when" or "responsive to determining," which depends on the context.

Based on frequency resource conditions of different regions, a high-speed-railway dedicated network and a common public Long-Term Evolution (LTE) network may use the same frequency or may use different frequencies. However, as the high-speed-railway dedicated network usually has better coverage, an user equipment not in the high-speed train may often access the high-speed-railway dedicated network, particularly in an urban region with a relatively large population, congestion of the high-speed-railway dedicated network may be caused by mobile terminals of users not in the high-speed trains. This can affect the communication quality of mobile users in the high-speed trains.

Figure 2:
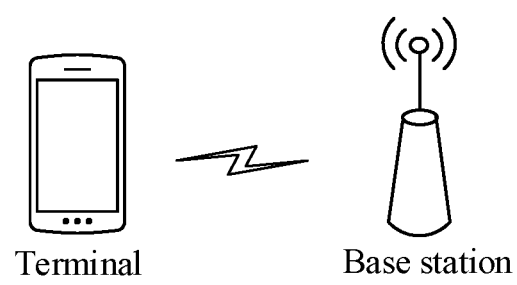
FIG. 2 is a diagram of an application scenario of a cell type indication method according to some embodiments of the present disclosure.

FIG. 1 is a flowchart showing a cell type indication method according to some embodiments of the present disclosure. FIG. 2 is a diagram of an application scenario of a cell type indication method according to some embodiments of the present disclosure. The cell type indication method may be applied to a base station managing a first cell. As shown in FIG. 1, the cell type indication method may include the following Steps 110-130.

In Step 110, a cell type of the first cell is determined. The cell type of the first cell including a cell providing dedicated network service for high-speed railway or a cell providing common public network service for LTE. In other words, the cell type of the first cell indicates that the first cell is a cell providing dedicated network service for high-speed railway or a cell providing common public network service for LTE.

In some embodiments of the present disclosure, the base station may manage one or more cells, and the first cell is one of these cells managed by the base station.

In Block 120, a system message for indicating the cell type of the first cell is determined.

In some embodiments of the present disclosure, the system message may include a content capable of indicating the cell type of the first cell. In this way, the system message may have a function of indicating the cell type of the first cell.

For example, a new information element may be added to the system message, and the new information element is configured to indicate the cell providing dedicated network service for high-speed railway. After receiving the system message, if a terminal finds that the system message includes the new information element, the terminal is aware that the cell is a cell providing dedicated network service for high-speed railway, and if the terminal finds that the system message does not include the new information element, the terminal is aware that the cell is a cell providing common public network service for LTE.

For another example, a special TAC may be allocated to the cell providing dedicated network service for high-speed railway and broadcast in the system message, and the special TAC may be broadcast only by cells served by the high-speed-railway dedicated network. After receiving the system message, if the terminal finds that the system message includes the special TAC, the terminal is aware that the cell is a cell providing dedicated network service for high-speed railway, and if the terminal finds that the system message does not include the special TAC, the terminal is aware that the cell is a cell providing common public network service for LTE.

In some embodiments, the system message indicating the cell type of the first cell may specifically be a system information block 1 (SIB1). The SIB1 is a system message 1 in the LTE network, and the SIB1 mainly includes information related to cell access of the terminal.

In Block 130, the system message indicating the cell type of the first cell is sent to a terminal, to enable the terminal to determine the cell type of the first cell according to the system message, and in response to determining to access the first cell according to the cell type of the first cell, initiate an access process to the first cell.

In an exemplary scenario, as shown in FIG. 2, a terminal and a base station are included. The base station, during cell type indication, may determine a cell type of a first cell at first, the cell type of the first cell including a cell providing dedicated network service for high-speed railway or a cell providing common public network service for LTE (in other words, the cell type of the first cell indicating the first cell is a cell providing dedicated network service for high-speed railway or a cell providing common public network service for LTE), then determine a system message to be used to indicate the cell type of the first cell, and finally send the system message indicating the cell type of the first cell to the terminal. In this way, the terminal may determine the cell type of the first cell according to the system message, and when determining to access the first cell according to the cell type of the first cell in combination with its own practical condition, initiate an access process to the first cell.

It can be seen from the embodiment that the cell type of the first cell may be determined at first, the cell type of the first cell including a cell providing dedicated network service for high-speed railway or a cell providing common public network service for LTE (in other words, the cell type of the first cell indicating the first cell is a cell providing dedicated network service for high-speed railway or a cell providing common public network service for LTE), the system message to be used to indicate the cell type of the first cell is determined, and then the system message indicating the cell type of the first cell is sent to the terminal. In this way, it is favorable for the terminal to determine whether the first cell is a cell providing dedicated network service for high-speed railway according to the system message and select a proper cell to access according to the cell type. Therefore, type indication for the cell providing dedicated network service for high-speed railway is implemented, and the cell access accuracy is further improved.

Figure 3:
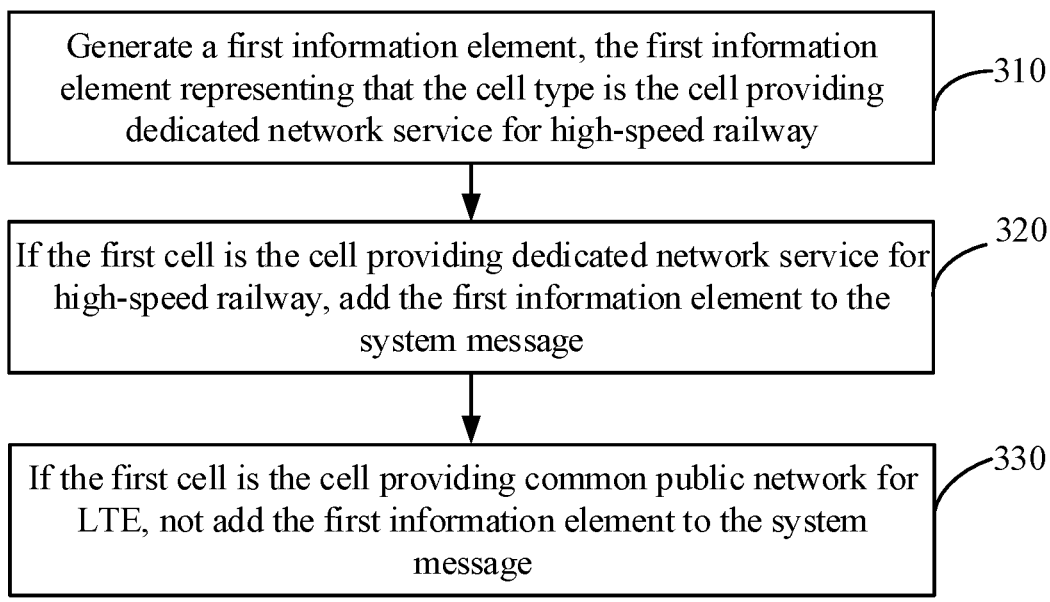
FIG. 3 is a flowchart showing another cell type indication method according to some embodiments of the present disclosure.

FIG. 3 is a flowchart showing another cell type indication method according to some embodiments of the present disclosure. The cell type indication method may be applied to a base station managing a first cell. Based on the method shown in FIG. 1. as shown in FIG. 3, the Block 120 may include the following Blocks 310 to 330.

In Block 310, a first information element is generated, the first information element representing that the first cell is the cell providing dedicated network service for high-speed railway.

In Block 320, if the cell type of the first cell is the cell providing dedicated network service for high-speed railway, the first information element is added to the system message.

In some embodiments, the system message with the first information element added therein may specifically be the SIB1.

In Block 330, if the first cell is a cell providing common public network service for LTE, the first information element is not added to the system message.

It can be seen from the embodiment that the first information element is used to represent that the cell type is the cell providing dedicated network service for high-speed railway; if the cell type of the first cell is the cell providing dedicated network service for high-speed railway, the first information element is added to the system message, and if the cell type of the first cell is the cell providing common public network service for LTE, the first information element is not added to the system message. In such a manner, the terminal may conveniently determine whether the first cell is a cell providing dedicated network service for high-speed railway according to whether the system message includes the first information element, so that the cell type indication reliability is improved, and the cell type indication efficiency is improved.

Figure 4:
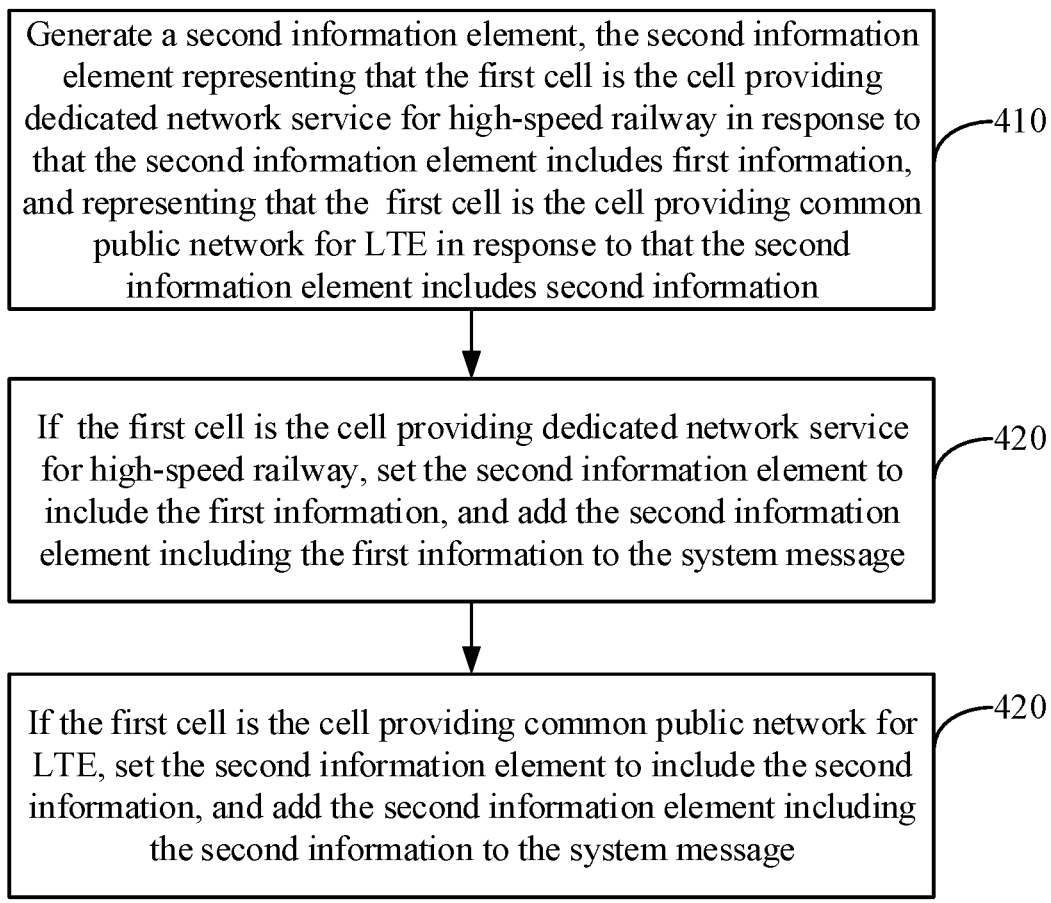
FIG. 4 is a flowchart showing another cell type indication method according to some embodiments of the present disclosure.

FIG. 4 is a flowchart showing another cell type indication method according to some embodiments of the present disclosure. The cell type indication method may be applied to a base station managing a first cell. Based on the method shown in FIG. 1, as shown in FIG. 4, Block 120 may include the following Blocks 410 to 430.

In Block 410, a second information element is generated, the second information element representing that the first cell is the cell providing dedicated network service for high-speed railway when the second information element includes first information, and represent that the first cell is the cell providing common public network service for LTE when the second information element includes second information.

In Block 420, if the cell type of the first cell is the cell providing dedicated network service for high-speed railway, the second information element is set to include the first information, and the second information element including the first information is added to the system message.

In some embodiments, the system message with add the second information element being added may specifically be the SIB1.

In Block 430, if the first cell is the cell providing common public network service for LTE, the content in the second information element is set to include the second information, and the second information element including the second information is added to the system message.

It can be seen from the embodiment that the second information element represents that the first cell is the cell providing dedicated network service for high-speed railway when the second information element includes the first information, and represents that the first cell is the cell providing common public network service for LTE when the second information element includes the second information. In such a manner, the terminal may conveniently determine whether the first cell is a cell providing dedicated network service for high-speed railway according to the content in the second information element. Therefore, the cell type indication reliability is improved, and the cell type indication efficiency is improved.

Figure 5:
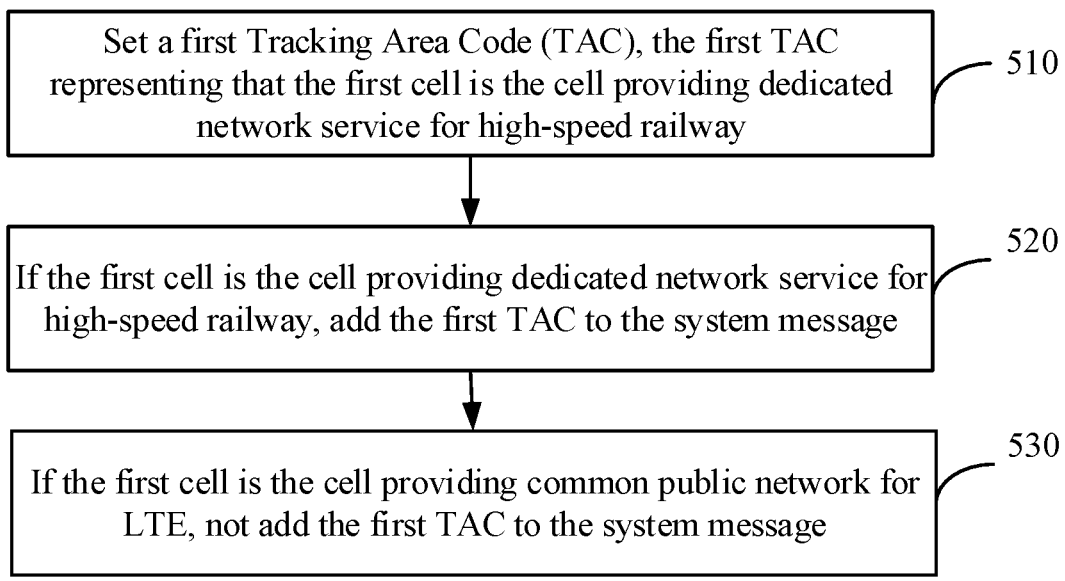
FIG. 5 is a flowchart showing another cell type indication method according to some embodiments of the present disclosure.

FIG. 5 is a flowchart showing another cell type indication method according to some embodiments of the present disclosure. The cell type indication method may be applied to a base station managing a first cell. Based on the method shown in FIG. 1, as shown in FIG. 5, Block 120 may include the following Blocks 510 to 530.

In Block 510, a first TAC is set, the first TAC representing that the first cell is the cell providing dedicated network service for high-speed railway.

In some embodiments of the present disclosure, the base station may manage one or more cells, some cells are cells served by the high-speed-railway dedicated network and other cells are cells of the common public LTE network.

The base station, when allocating first TACs to one or more managed cells served by the high-speed-railway dedicated network, may allocate the same first TAC to all the cells served by the high-speed-railway dedicated network.

In Block 520, if the cell type of the first cell is the cell providing dedicated network service for high-speed railway, the first TAC is added to the system message.

In some embodiments, the system message with the first TAC being added may specifically be the SIB1.

In Block 530, if the first cell is the cell providing common public network service for LTE, the first TAC is not added to the system message.

It can be seen from the embodiment that the first TAC represents that the first cell is a cell of the high-speed-railway dedicated network, if the first cell is a cell of the high-speed-railway dedicated network, the first TAC is added to the system message, and if the cell type of the first cell is the cell providing common public network service for LTE, the first TAC is not added to the system message. In such a manner, the terminal may conveniently determine whether the first cell is the cell providing dedicated network service for high-speed railway according to whether the system message includes the first TAC. Therefore, the cell type indication reliability is improved, and the cell type indication efficiency is improved.

Figure 6:
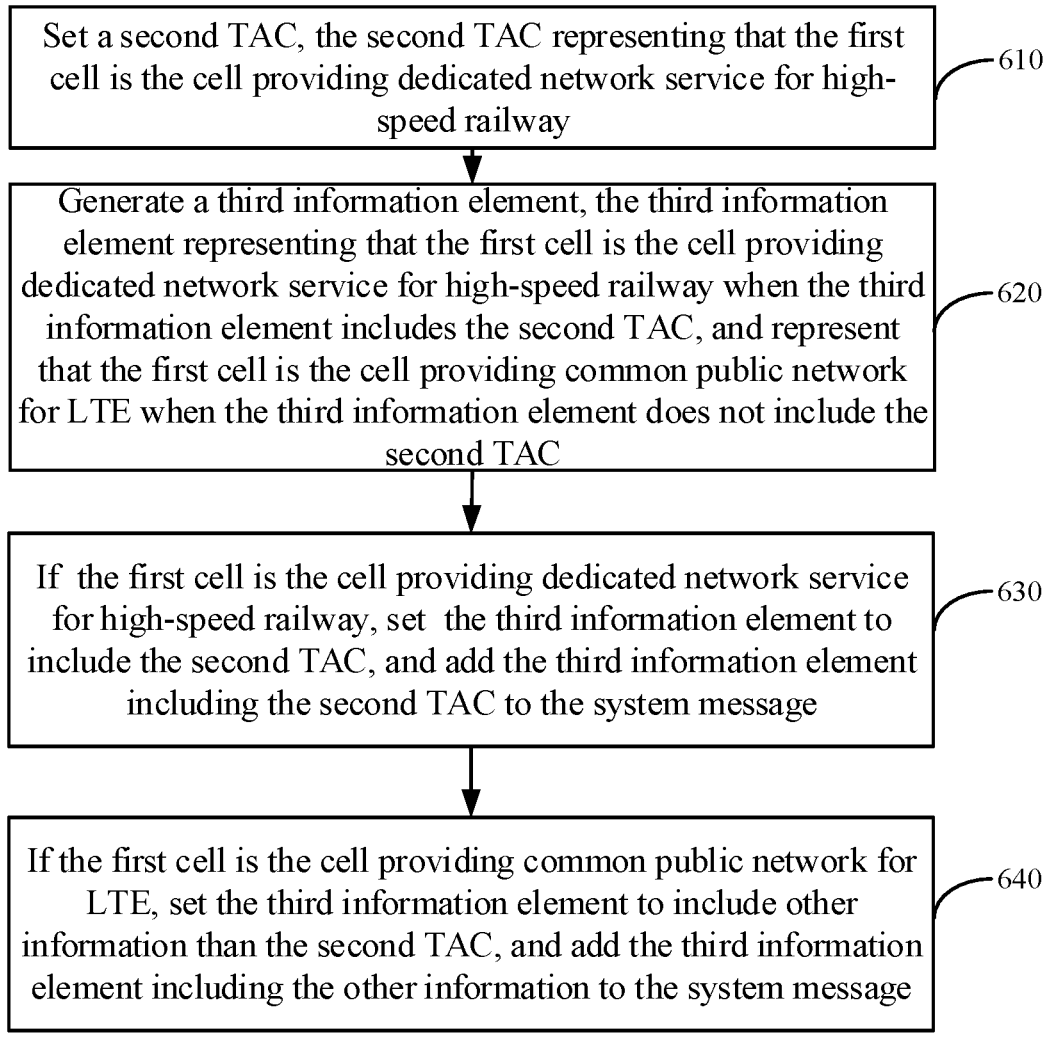
FIG. 6 is a flowchart showing another cell type indication method according to some embodiments of the present disclosure.

FIG. 6 is a flowchart showing another cell type indication method according to some embodiments of the present disclosure. The cell type indication method may be applied to a base station managing a first cell. Based on the method shown in FIG. 1, as shown in FIG. 6, Block 120 may include the following Blocks 610 to 640.

In Block 610, a second TAC is set, the second TAC representing that the first cell is a cell of the high-speed-railway dedicated network.

In some embodiments of the present disclosure, the base station may manage one or more cells, some cells are cells served by the high-speed-railway dedicated network and other cells are cells of the common public LTE network.

The base station, when allocating second TACs to one or more managed cells served by the high-speed-railway dedicated network, may allocate the same second TAC to all the cells served by the high-speed-railway dedicated network.

In Block 620, a third information element is generated, the third information element representing that the first cell is the cell providing dedicated network service for high-speed railway when the third information element includes the second TAC, and represent that the first cell is the cell providing common public network for LTE when the third information element does not include the second TAC.

In Block 630, if the first cell is the cell providing dedicated network service for high-speed railway, the third information element is set to include the second TAC, and the third information element including the second TAC is added to the system message.

In some embodiments, the system message with the third information element being added may specifically be the SIB1.

In Block 640, if the first cell is the cell providing common public network for LTE, the third information element is set to include other information than the second TAC, and the third information element including the other information is added to the system message.

It can be seen from the embodiment that, the third information element including the second TAC represents that the first cell is the cell providing dedicated network service for high-speed railway and the third information element not including the second TAC represents that the first cell is the cell providing common public network for LTE. In such a manner, the terminal may conveniently determine whether the first cell is a cell providing dedicated network service for high-speed railway according to whether the third information element includes the second TAC. Therefore, the cell type indication reliability is improved, and the cell type indication efficiency is improved.

Figure 7:
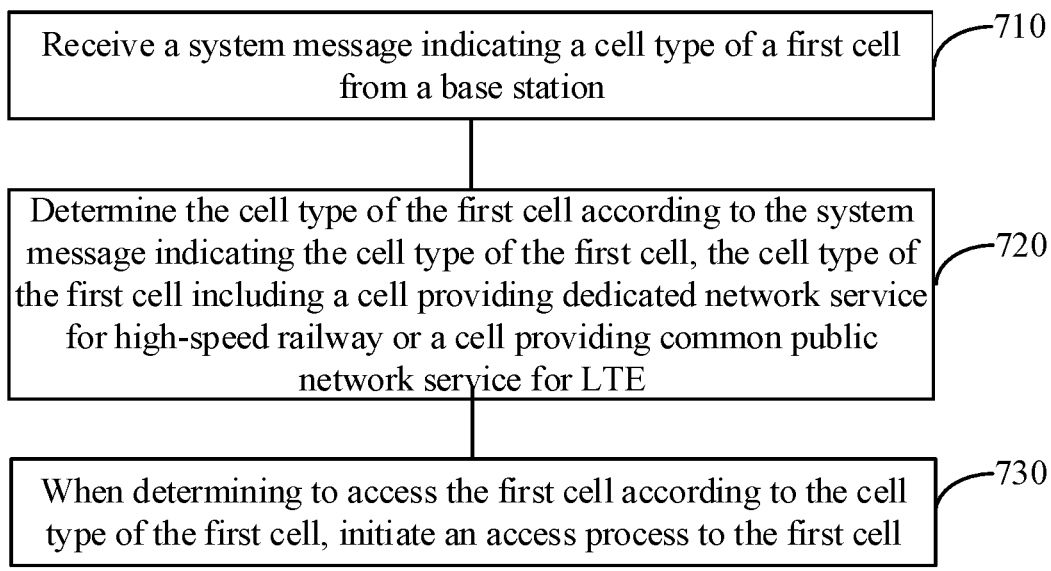
FIG. 7 is a flowchart showing a cell type indication method according to some embodiments of the present disclosure.

FIG. 7 is a flowchart showing a cell type indication method according to some embodiments of the present disclosure. The cell type indication method may be applied to a terminal. As shown in FIG. 7, the cell type indication method may include the following Blocks 710 to 730.

In Block 710, a system message indicating a cell type of a first cell is received from a base station.

In some embodiments of the present disclosure, the base station may manage one or more cells, and the first cell is one of these cells managed by the base station.

In some embodiments, the system message indicating the cell type of the first cell may specifically be an SIB1.

In Block 720, the cell type of the first cell is determined according to the system message indicating the cell type of the first cell, the cell type of the first cell including a cell providing dedicated network service for high-speed railway or a cell providing common public network service for LTE (in other words, the cell type indicates the first cell is a cell providing dedicated network service for high-speed railway or a cell providing common public network service for LTE).

In some embodiments of the present disclosure, the system message may include a content capable of indicating the cell type of the first cell, and the terminal may determine the cell type of the first cell according to the content.

For example, the base station adds a new information element to the system message, and the new information element is configured to indicate a cell providing dedicated network service for high-speed railway. After receiving the system message, if the terminal finds that the system message includes the new information element, the terminal is aware that the cell is the cell providing dedicated network service for high-speed railway, and if the terminal finds that the system message does not include the new information element, the terminal is aware that the cell is the cell providing common public network service for LTE.

For another example, the base station allocates a special TAC to the cell providing dedicated network service for high-speed railway and broadcasts the special TAC in the system message, and the special TAC may be broadcast only by the cell providing dedicated network service for high-speed railway. After receiving the system message, if the terminal finds that the system message includes the special TAC, the terminal is aware that the cell is a cell providing dedicated network service for high-speed railway, and if the terminal finds that the system message does not include the special TAC, the terminal is aware that the cell is the cell providing common public network service for LTE.

In Block 730, when determining to access the first cell according to the cell type of the first cell, access to the first cell is initiated.

It can be seen from the embodiment that the system message indicating the cell type of the first cell is received from the base station, the cell type of the first cell is determined according to the system message indicating the cell type of the first cell, the cell type of the first cell including a cell providing dedicated network service for high-speed railway or a cell providing common public network service for LTE (the cell type of the first cell indicating that the first cell is a cell providing dedicated network service for high-speed railway or a cell providing common public network service for LTE), and when determining to access the first cell according to the cell type of the first cell, an access process to the first cell is initiated. Therefore, a proper cell may be selected for access according to the cell type, and the cell access accuracy is improved.

Figure 8:
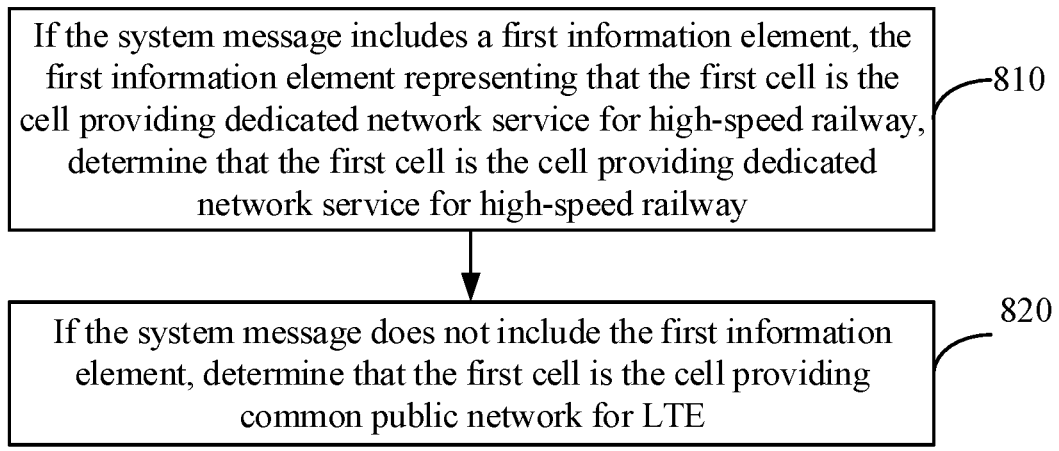
FIG. 8 is a flowchart showing another cell type indication method according to some embodiments of the present disclosure.

FIG. 8 is a flowchart showing another cell type indication method according to some embodiments of the present disclosure. The cell type indication method may be applied to a terminal. Based on the method shown in FIG. 7, as shown in FIG. 8, Block 720 may include the following Blocks 810 to 820.

In Block 810, if the system message includes a first information element, the first information element representing that the first cell is the cell providing dedicated network service for high-speed railway, it is determined that the first cell is the cell providing dedicated network service for high-speed railway.

In Block 820, if the system message does not include the first information element, it is determined that the first cell is the cell providing common public network for LTE.

It can be seen from the embodiment that the first information element may represent that the first cell is the cell providing dedicated network service for high-speed railway; if the system message includes the first information element, the first information element representing that the first cell is the cell providing dedicated network service for high-speed railway, it is determined that the first cell is the cell providing dedicated network service for high-speed railway; and if the system message does not include the first information element, it is determined that the first cell is the cell providing common public network for LTE. Therefore, the cell type indication reliability is improved, and the cell type determination efficiency is improved.

Figure 9:
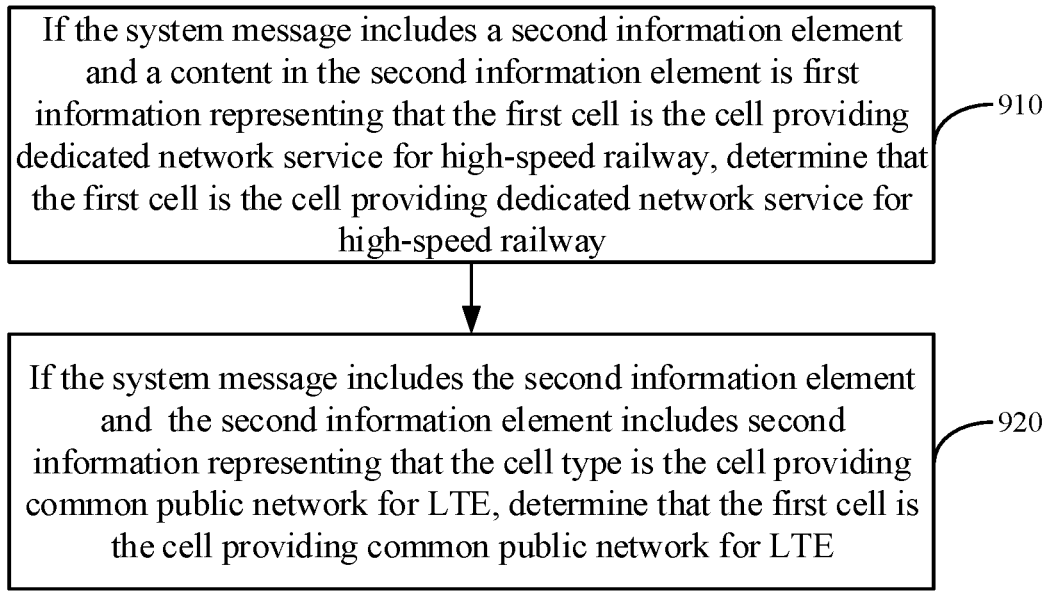
FIG. 9 is a flowchart showing another cell type indication method according to some embodiments of the present disclosure.

FIG. 9 is a flowchart showing another cell type indication method according to some embodiments of the present disclosure. The cell type indication method may be applied to a terminal. Based on the method shown in FIG. 7, as shown in FIG. 9, Block 720 may include the following Blocks 910 to 920.

In Block 910, if the system message includes a second information element and a content in the second information element includes first information representing that the first cell is the cell providing dedicated network service for high-speed railway, it is determined that the first cell is the cell providing dedicated network service for high-speed railway.

In Block 920, if the system message includes the second information element and the second information element includes second information representing that the first cell is the cell providing common public network for LTE, it is determined that the first cell is the cell providing common public network for LTE.

It can be seen from the embodiment that the second information element may be used to represent that the first cell is the cell providing dedicated network service for high-speed railway when the second information element includes the first information and the second information element may represent that the first cell is the cell providing common public network for LTE when the second information element includes the second information; if the system message includes the second information element and the second information element includes the first information, the first information representing that the first cell is the cell providing dedicated network service for high-speed railway, it is determined that the first cell is the cell providing dedicated network service for high-speed railway; and if the system message includes the second information element and the second information element includes the second information representing that the first cell is the cell providing common public network for LTE, it is determined that the first cell is the cell providing common public network for LTE. Therefore, the cell type indication reliability is improved, and the cell type determination efficiency is improved.

Figure 10:
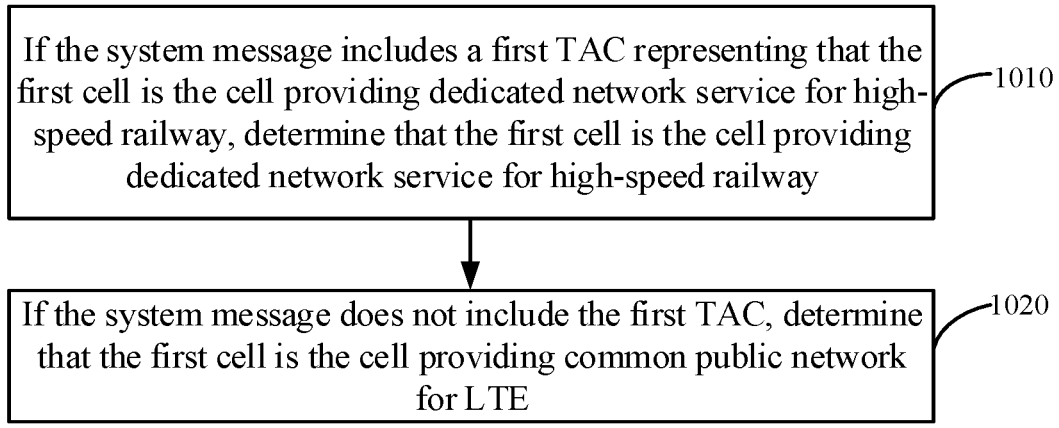
FIG. 10 is a flowchart showing another cell type indication method according to some embodiments of the present disclosure.

FIG. 10 is a flowchart showing another cell type indication method according to some embodiments of the present disclosure. The cell type indication method may be applied to a terminal. Based on the method shown in FIG. 7, as shown in FIG. 10, Block 720 may include the following Blocks 1010 to 1020.

In Block 1010, if the system message includes a first TAC representing that the first cell is the cell providing dedicated network service for high-speed railway, it is determined that the first cell is the cell providing dedicated network service for high-speed railway.

In Block 1020, if the system message does not include the first TAC, it is determined that the first cell is the cell providing common public network for LTE.

It can be seen from the embodiment that the first TAC may represent that the first cell is the cell providing dedicated network service for high-speed railway; if the system message includes the first TAC representing that the first cell is the cell providing dedicated network service for high-speed railway, it is determined that the first cell is the cell providing dedicated network service for high-speed railway; and if the system message does not include the first TAC, it is determined that the first cell is the cell providing common public network for LTE. Therefore, the cell type indication reliability is improved, and the cell type determination efficiency is improved.

Figure 11:
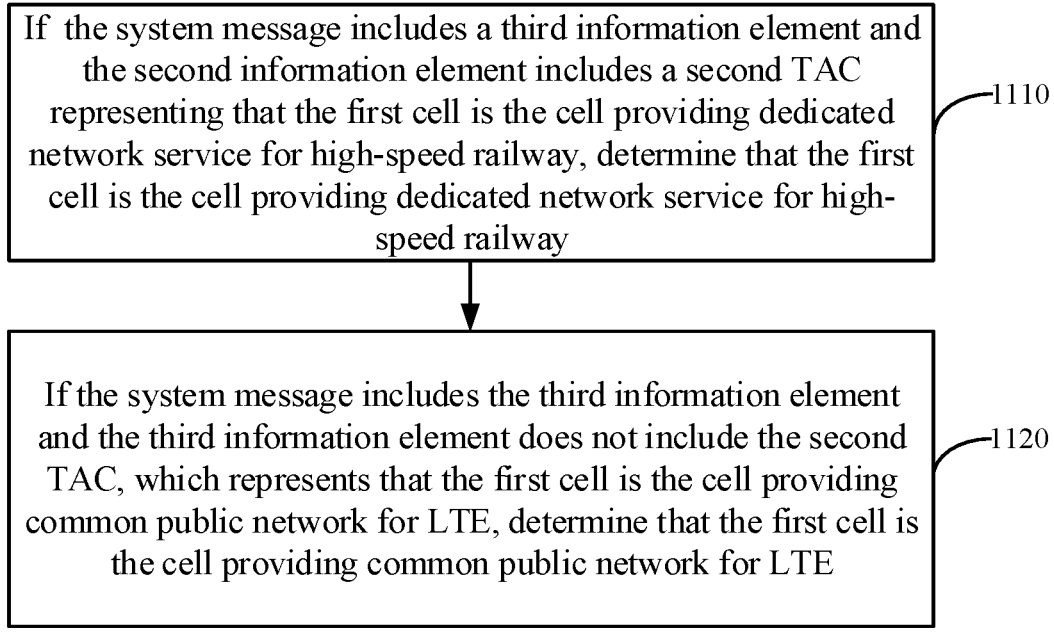
FIG. 11 is a flowchart showing another cell type indication method according to some embodiments of the present disclosure.

FIG. 11 is a flowchart showing another cell type indication method according to some embodiments of the present disclosure. The cell type indication method may be applied to a terminal. Based on the method shown in FIG. 7. as shown in FIG. 11, Block 720 may include the following Blocks 1110 to 1120.

In Block 1110, if the system message includes a third information element and the second information element includes a second TAC representing that the first cell is the cell providing dedicated network service for high-speed railway, it is determined that the first cell is the cell providing dedicated network service for high-speed railway.

In Block 1120, if the system message includes the third information element and the third information element does not include the second TAC, which represents that the first cell is the cell providing common public network for LTE, it is determined that the first cell is the cell providing common public network for LTE.

It can be seen from the embodiment that the second TAC may be used to represent that the first cell is the cell providing dedicated network service for high-speed railway; if the system message includes the third information element and the third information element includes the second TAC representing that the cell type is the cell providing dedicated network service for high-speed railway, it is determined that the first cell is the cell providing dedicated network service for high-speed railway; and if the system message includes the third information element and the third information element does not include the second TAC, which represents that the first cell is the cell providing common public network for LTE, it is determined that the first cell is the cell providing common public network for LTE. Therefore, the cell type indication reliability is improved, and the cell type determination efficiency is improved.

Figure 12:
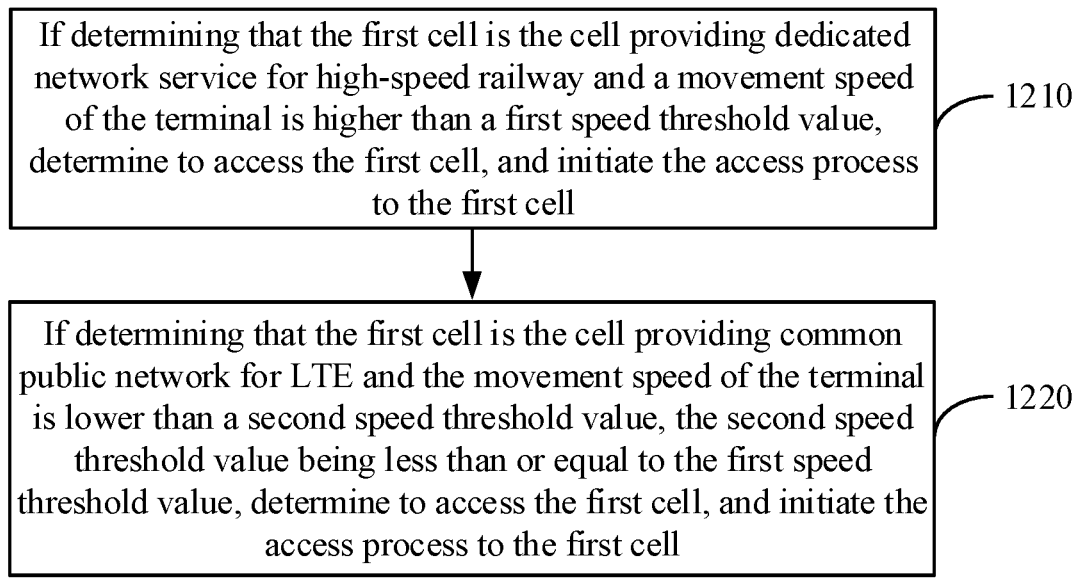
FIG. 12 is a flowchart showing another cell type indication method according to some embodiments of the present disclosure.

FIG. 12 is a flowchart showing another cell type indication method according to some embodiments of the present disclosure. The cell type indication method may be applied to a terminal. Based on the method shown in FIG. 7, When Block 730 is executed, the terminal may select a proper cell to access according to its own user type (i.e., a user taking a high-speed train or an ordinary user). For example, if a movement speed of the terminal is higher than a first speed threshold value, a cell providing dedicated network service for high-speed railway is selected for access; and if the movement speed of the terminal is lower than a second speed threshold value, a cell providing common public network service for LTE is selected for access. As shown in FIG. 12, the Block 703 may include the following Blocks 1210 to 1220.

In Block 1210, if it is determined that the first cell is the cell providing dedicated network service for high-speed railway and a movement speed of the terminal is higher than a first speed threshold value, it is determined to access to the first cell, and an access process to the first cell is initiated.

In Block 1220, if it is determined that the first cell is the cell providing common public network for LTE and the movement speed of the terminal is lower than a second speed threshold value, the second speed threshold value being less than or equal to the first speed threshold value, it is determined to access the first cell, and an access process to the first cell is initiated.

It can be seen from the embodiment that, if it is determined that the first cell is the cell providing dedicated network service for high-speed railway and the movement speed of the terminal is higher than the first speed threshold value, it is determined to access the first access, and an access process to the first cell is initiated; and if it is determined that the first cell is the cell providing common public network for LTE and the movement speed of the terminal is lower than the second speed threshold value, the second speed threshold value being less than or equal to the first speed threshold value, it is determined that accessing the first cell is required and an access process to the first cell is initiated. Therefore, a proper cell may be selected for access according to the cell type, and the cell access efficiency is improved.

Figure 13:
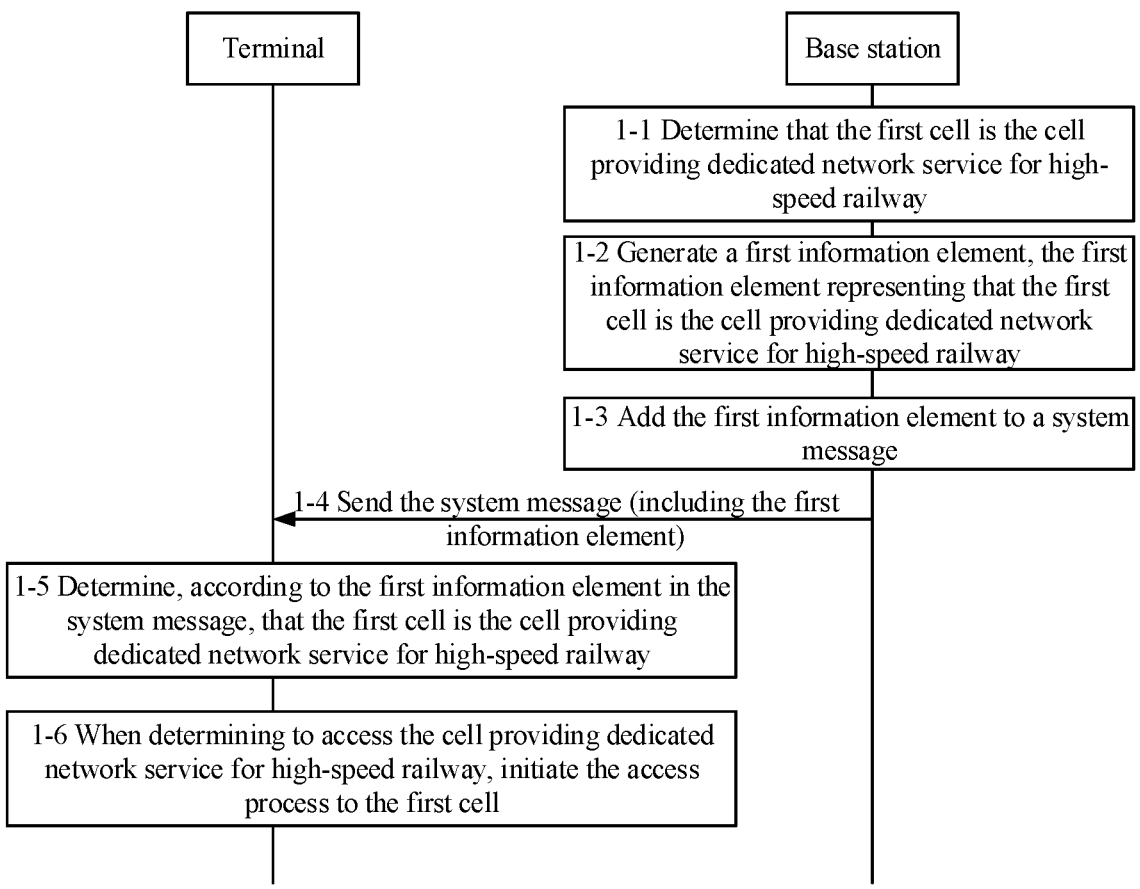
FIG. 13 is an information interaction diagram of a cell type indication method according to some embodiments of the present disclosure.

FIG. 13 is an information interaction diagram of a cell type indication method according to some embodiments of the present disclosure. As shown in FIG. 13, a terminal and a base station are involved. The base station may manage one or more cells, and a first cell in the present disclosure is one of these cells managed by the base station. An information interaction process of the terminal and the base station is specifically described with the condition that a cell type of the first cell is a cell providing dedicated network service for high-speed railway as an example.

In (1-1), the base station determines that the first cell is the cell providing dedicated network service for high-speed railway.

In (1-2), the base station generates a first information element, the first information element representing that the first cell is the cell providing dedicated network service for high-speed railway.

In (1-3), the base station adds the first information element to a system message.

In (1-4), the base station sends the system message to the terminal, the system message including the first information element.

In (1-5), the terminal determines according to the first information element in the system message, that the first cell is the cell providing dedicated network service for high-speed railway.

In (1-6), when it is determined to access the cell providing dedicated network service for high-speed railway, an access process to the first cell is initiated.

Figure 14:
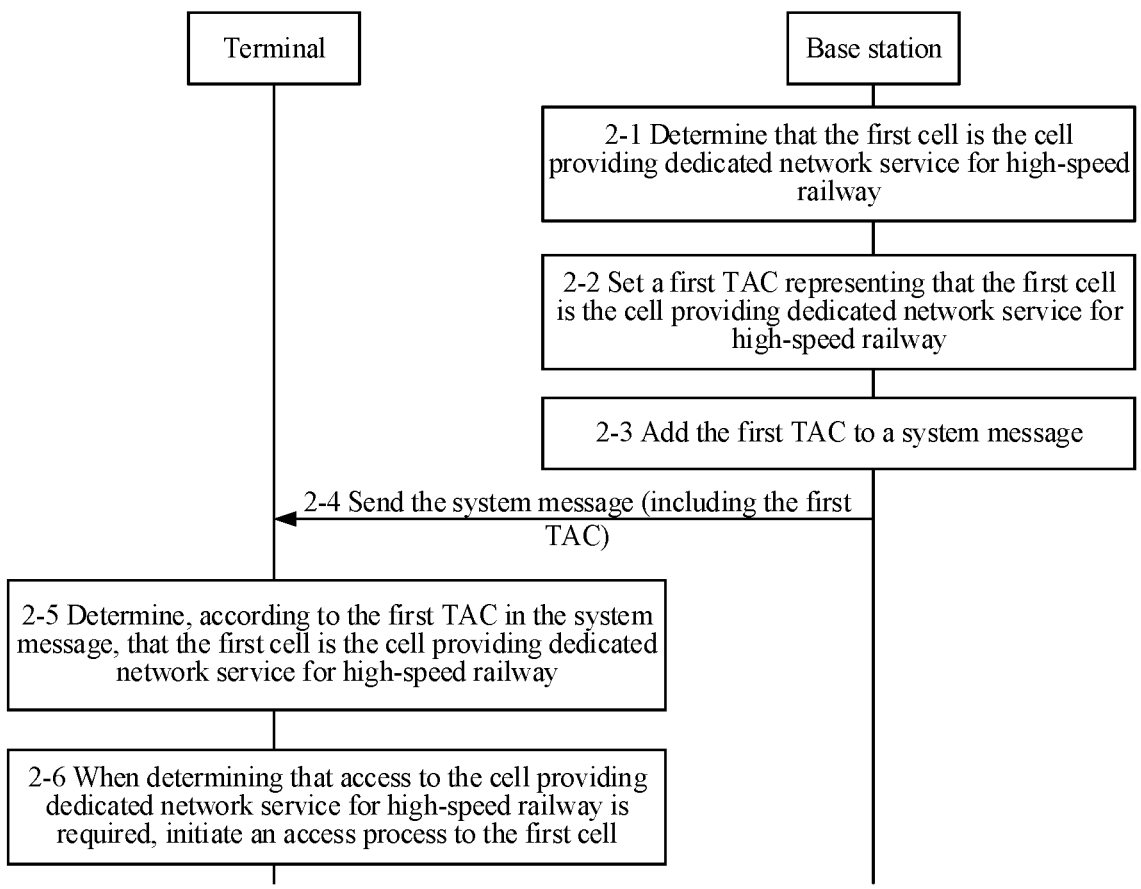
FIG. 14 is another information interaction diagram of a cell type indication method according to some embodiments of the present disclosure.

FIG. 14 is an information interaction diagram of another cell type indication method according to some embodiments of the present disclosure. As shown in FIG. 14, a terminal and a base station are involved. The base station may manage one or more cells, and a first cell in the present disclosure is one of these cells managed by the base station. An information interaction process of the terminal and the base station is specifically described with the condition that a cell type of the first cell is a cell providing dedicated network service for high-speed railway as an example.

In (2-1), the base station determines that the first cell is the cell providing dedicated network service for high-speed railway.

In (2-2), the base station sets a first TAC representing that the first cell is the cell providing dedicated network service for high-speed railway.

In (2-3), the base station adds the first TAC to a system message.

In (2-4), the base station sends the system message to the terminal, the system message including the first TAC.

In (2-5), the terminal determines, according to the first TAC in the system message, that the first cell is the cell providing dedicated network service for high-speed railway.

In (2-6), when it is determined that access to the cell providing dedicated network service for high-speed railway is required, an access process to the first cell is initiated.

Corresponding to the embodiments of the cell type indication method, the present disclosure also provides embodiments of a cell type indication device.

Figure 15:
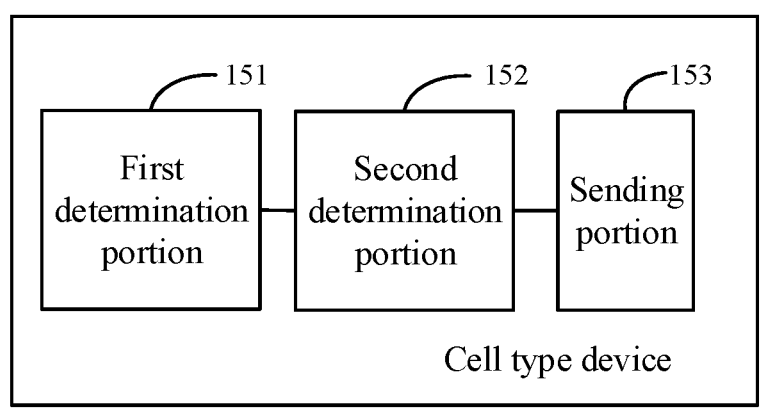
FIG. 15 is a block diagram of a cell type indication device according to some embodiments of the present disclosure.

FIG. 15 is a block diagram of a cell type indication device according to some embodiments of the present disclosure. The cell type indication device may be applied to a base station managing a first cell, and is configured to execute the cell type indication method shown in FIG. 1. As shown in FIG. 15, the cell type indication device may include a first determination portion 151, a second determination portion 152, and a sending portion 153.

The first determination portion 151 is configured to determine a cell type of the first cell, the cell type of the first cell including a cell providing dedicated network service for high-speed railway or a cell providing common public network service for LTE (in other words, the cell type of the first cell indicates the first cell is a cell providing dedicated network service for high-speed railway or a cell providing common public network service for LTE).

The second determination portion 152 is configured to determine a system message to be used to indicate the cell type of the first cell.

The sending portion 153 is configured to send the system message to a terminal to enable the terminal to determine the cell type of the first cell according to the system message, and when determining to access the first cell according to the cell type of the first cell, initiate an access process to the first cell.

It can be seen from the embodiment that the cell type of the first cell may be determined at first, the cell type of the first cell including the cell providing dedicated network service for high-speed railway or the cell providing common public network service for LTE, the system message to be used to indicate the cell type of the first cell is determined, and then the system message indicating the cell type of the first cell is sent to the terminal, and such a manner is favorable for the terminal to determine whether the first cell is the cell providing dedicated network service for high-speed railway or not according to the system message and select a proper cell to access according to the cell type, so that type indication for the cell providing dedicated network service for high-speed railway is implemented, and the cell access accuracy is further improved.

Figure 16:
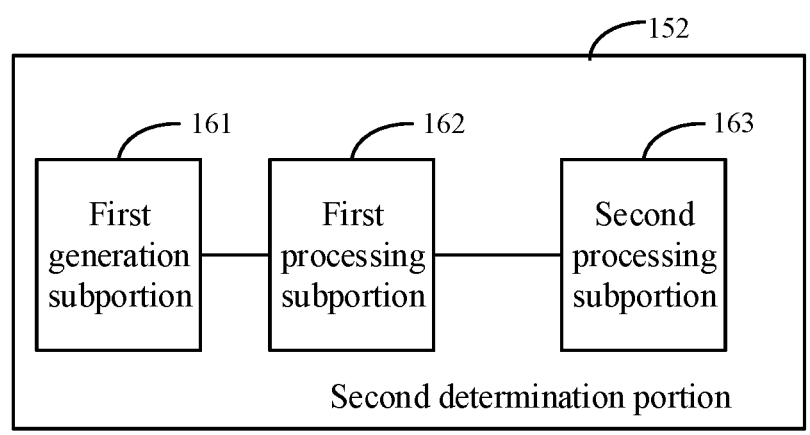
FIG. 16 is a block diagram of another cell type indication device according to some embodiments of the present disclosure.

In some embodiments, based on the device shown in FIG. 15, as shown in FIG. 16, the second determination portion 152 may include:

a first generation subportion 161, configured to generate a first information element, the first information element representing that the first cell is the cell providing dedicated network service for high-speed railway;

a first processing subportion 162, configured to, if the first cell is the cell providing dedicated network service for high-speed railway, add the first information element to the system message; and a second processing subportion 163, configured to, if the first cell is the cell providing common public network for LTE, not add the first information element to the system message.

It can be seen from the embodiment that the first information element represents that the first cell is the cell providing dedicated network service for high-speed railway, if the first cell is the cell providing dedicated network service for high-speed railway, the first information element is added to the system message, and if the first cell is the cell providing common public network for LTE, the first information element is not added to the system message. In such a manner, the terminal may conveniently determine whether the first cell is the cell providing dedicated network service for high-speed railway or not according to whether the system message includes the first information element or not, so that the cell type indication reliability is improved, and the cell type indication efficiency is further improved.

Figure 17:
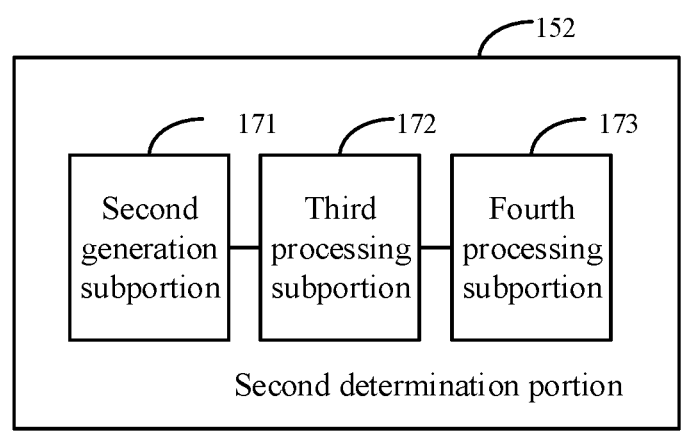
FIG. 17 is a block diagram of another cell type indication device according to some embodiments of the present disclosure.

In some embodiments, based on the device shown in FIG. 15, as shown in FIG. 17, the second determination portion 152 may include:

a second generation subportion 171, configured to generate a second information element, the second information element representing that the first cell is the cell providing dedicated network service for high-speed railway when the second information element includes first information, and representing that the first cell is the cell providing common public network for LTE when the second information element includes second information;

a third processing subportion 172, configured to, if the first cell is the cell providing dedicated network service for high-speed railway, set the content in the second information element to be the first information and add the second information element including the first information to the system message; and a fourth processing subportion 173, configured to, if the first cell is the cell providing common public network for LTE, set the content in the second information element to include the second information and add the second information element including the second information to the system message.

It can be seen from the embodiment that the second information element represents that the first cell is the cell providing dedicated network service for high-speed railway when the second information element includes the first information, and represents that the first cell is the cell providing common public network for LTE when the second information element includes the second information. In such a manner, the terminal may conveniently determine whether the first cell is the cell providing dedicated network service for high-speed railway or not according to the content in the second information element, so that the cell type indication reliability is improved, and the cell type indication efficiency is further improved.

Figure 18:
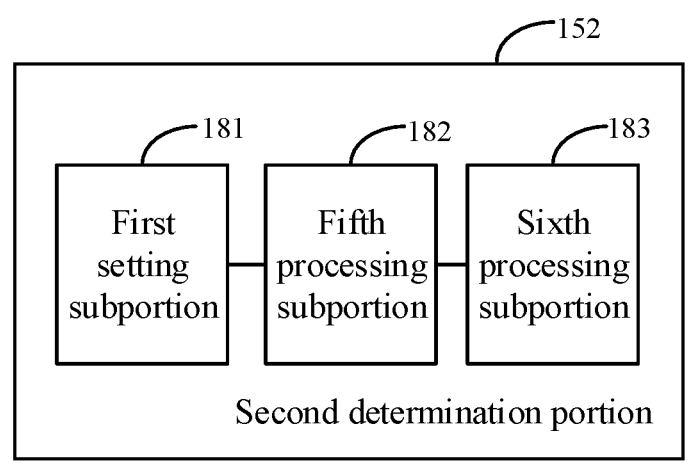
FIG. 18 is a block diagram of another cell type indication device according to some embodiments of the present disclosure.

In some embodiments, based on the device shown in FIG. 15, as shown in FIG. 18, the second determination portion 152 may include:

a first setting subportion 181, configured to set a first TAC representing that the first cell is the cell providing dedicated network service for high-speed railway;

a fifth processing subportion 182, configured to, if the first cell is the cell providing dedicated network service for high-speed railway, add the first TAC to the system message; and a sixth processing subportion 183, configured to, if the first cell is the cell providing common public network for LTE, not add the first TAC to the system message.

It can be seen from the embodiment that the first TAC represents that the first cell is the cell providing dedicated network service for high-speed railway, if the first cell is the cell providing dedicated network service for high-speed railway, the first TAC is added to the system message, and if the first cell is the cell providing common public network for LTE, the first TAC is not added to the system message. In such a manner, the terminal may conveniently determine whether the first cell is the cell providing dedicated network service for high-speed railway or not according to whether the system message includes the first TAC or not, so that the cell type indication reliability is improved, and the cell type indication efficiency is further improved.

Figure 19:
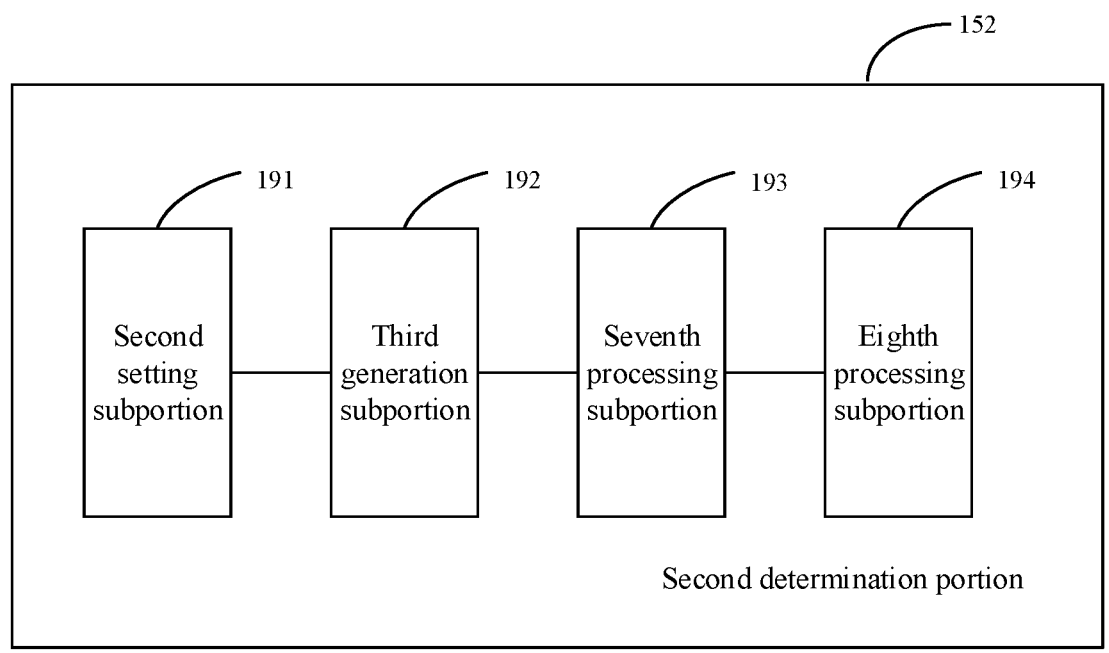
FIG. 19 is a block diagram of another cell type indication device according to some embodiments of the present disclosure.

In some embodiments, based on the device shown in FIG. 15, as shown in FIG. 19, the second determination portion 152 may include:

a second setting subportion 191, configured to set a second TAC representing that the first cell is the cell providing dedicated network service for high-speed railway;

a third generation subportion 192, configured to generate a third information element, the third information element representing that the first cell is the cell providing dedicated network service for high-speed railway when the third information element includes the second TAC, representing that the first cell is the cell providing common public network for LTE when the third information element does not include the second TAC;

a seventh processing subportion 193, configured to, if the first cell is the cell providing dedicated network service for high-speed railway, set the third information element to include the second TAC and add the third information element including the second TAC to the system message; and an eighth processing subportion 194, configured to, if the first cell is the cell providing common public network for LTE, set the third information element to include other information than the second TAC and add the third information element including the other information to the system message.

It can be seen from the embodiment that the third information element including the second TAC represents that the first cell is the cell providing dedicated network service for high-speed railway and the third information element not including the second TAC represents that the first cell is the cell providing common public network for LTE. In such a manner, the terminal may conveniently determine whether the first cell is the cell providing dedicated network service for high-speed railway or not according to whether the third information element includes the second TAC or not, so that the cell type indication reliability is improved, and the cell type indication efficiency is further improved.

In some embodiments, based on the device shown in FIG. 15, the system message is specifically a SIB1.

It can be seen from the embodiment that the cell type of the first cell is indicated through the SIB1, so that the cell type indication reliability is improved.

Figure 20:
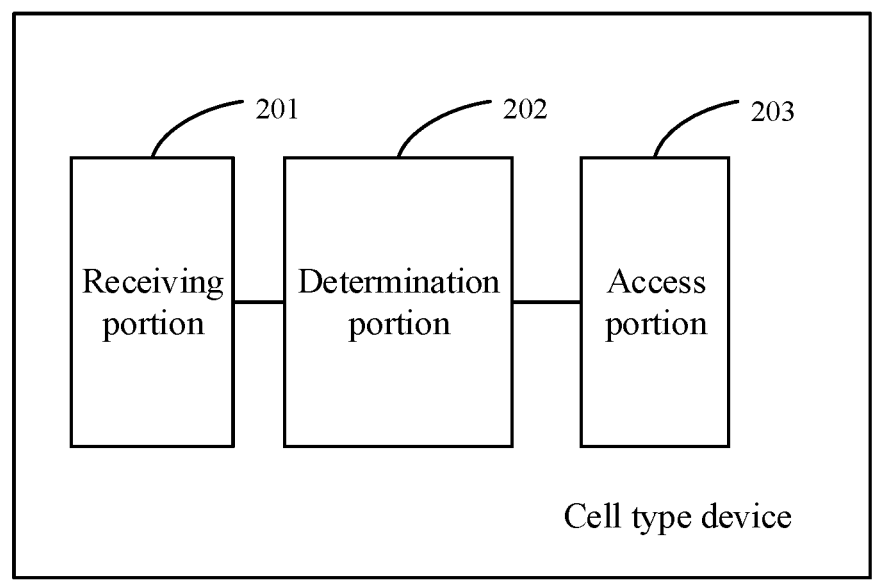
FIG. 20 is a block diagram of a cell type indication device according to some embodiments of the present disclosure.

FIG. 20 is a block diagram of a cell type indication device according to some embodiments of the present disclosure. The cell type indication device may be applied to a terminal, and is configured to execute the cell type indication method shown in FIG. 7. As shown in FIG. 20, the cell type indication device may include:

a receiving portion 201, configured to receive a system message indicating a cell type of a first cell from a base station;

a determination portion 202, configured to determine the cell type of the first cell according to the system message, the cell type of the first cell including a cell providing dedicated network service for high-speed railway or a cell providing common public network service for LTE; and an access portion 203, configured to, when determining to access the first cell according to the cell type of the first cell, initiate the access process to the first cell.

It can be seen from the embodiment that the system message indicating the cell type of the first cell is received from the base station, the cell type of the first cell is determined according to the system message indicating the cell type of the first cell, the cell type of the first cell including the cell providing dedicated network service for high-speed railway or the cell providing common public network service for LTE, and when determining to access the first cell according to the cell type of the first cell, an access process to the first cell is initiated, so that a proper cell may be selected for access according to the cell type, and the cell access accuracy is further improved.

Figure 21:
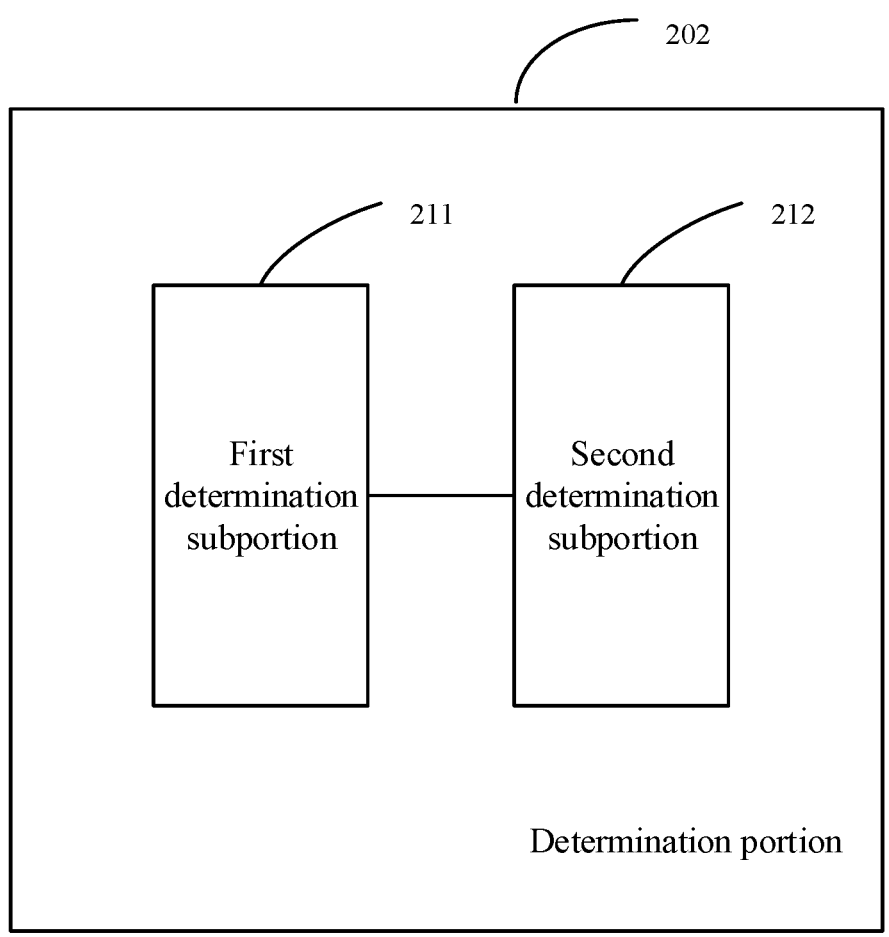
FIG. 21 is a block diagram of another cell type indication device according to some embodiments of the present disclosure.

In some embodiments, based on the device shown in FIG. 20, as shown in FIG. 21, the determination portion 202 may include:

a first determination subportion 211, configured to, if the system message includes a first information element, the first information element representing that the first cell is the cell providing dedicated network service for high-speed railway, determine that the first cell is the cell providing dedicated network service for high-speed railway; and a second determination subportion 212, configured to, if the system message does not include the first information element, determine that the cell type of the first cell is a cell providing common public network service for LTE.

It can be seen from the embodiment that the first information element may represent that the first cell is the cell providing dedicated network service for high-speed railway; if the system message includes the first information element, the first information element representing that the first cell is the cell providing dedicated network service for high-speed railway, it is determined that the first cell is the cell providing dedicated network service for high-speed railway; and if the system message does not include the first information element, it is determined that the first cell is the cell providing common public network for LTE. Therefore, the cell type indication reliability is improved, and the cell type determination efficiency is further improved.

Figure 22:
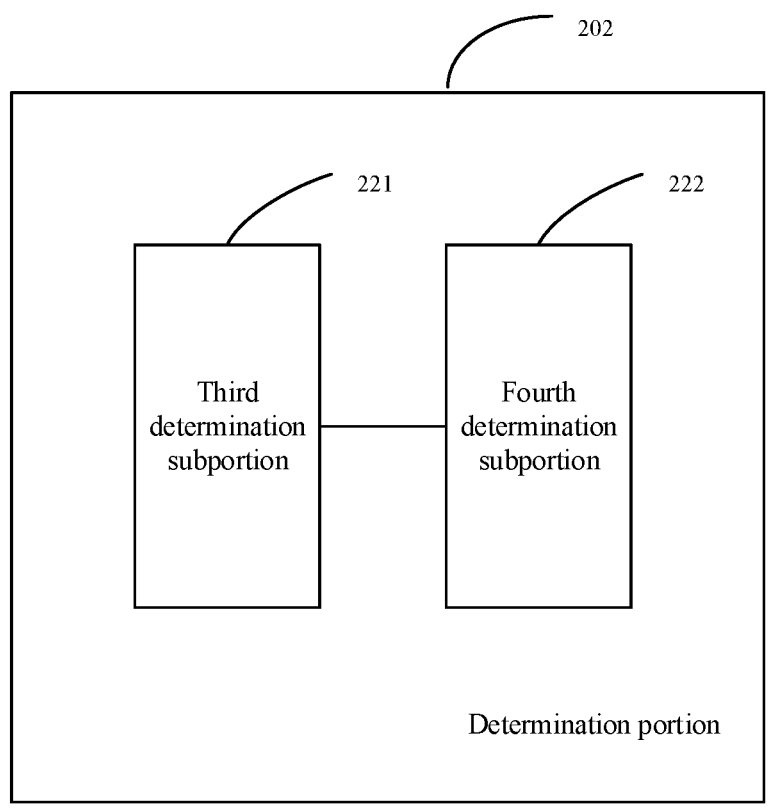
FIG. 22 is a block diagram of another cell type indication device according to some embodiments of the present disclosure.

In some embodiments, based on the device shown in FIG. 20, as shown in FIG. 22, the determination portion 202 may include:

a third determination subportion 221, configured to, if the system message includes a second information element and the second information element includes first information representing that the first cell is the cell providing dedicated network service for high-speed railway, determine that the first cell is the cell providing dedicated network service for high-speed railway; and a fourth determination subportion 222, configured to, if the system message includes the second information element and the second information element includes second information representing that the first cell is the cell providing common public network for LTE, determine that the first cell is the cell providing common public network for LTE.

It can be seen from the embodiment that the second information element may represent that the first cell is the cell providing dedicated network service for high-speed railway when the second information element includes the first information and the second information element may represent that the first cell is a cell providing common public network service for LTE when the content therein is the second information; if the system message includes the second information element and the second information element includes the first information representing that the first cell is the cell providing dedicated network service for high-speed railway, it is determined that the first cell is the cell providing dedicated network service for high-speed railway; and if the system message includes the second information element and the second information element includes the second information representing that the first cell is the cell providing common public network for LTE, it is determined that the first cell is the cell providing common public network for LTE. Therefore, the cell type indication reliability is improved, and the cell type determination efficiency is further improved.

Figure 23:
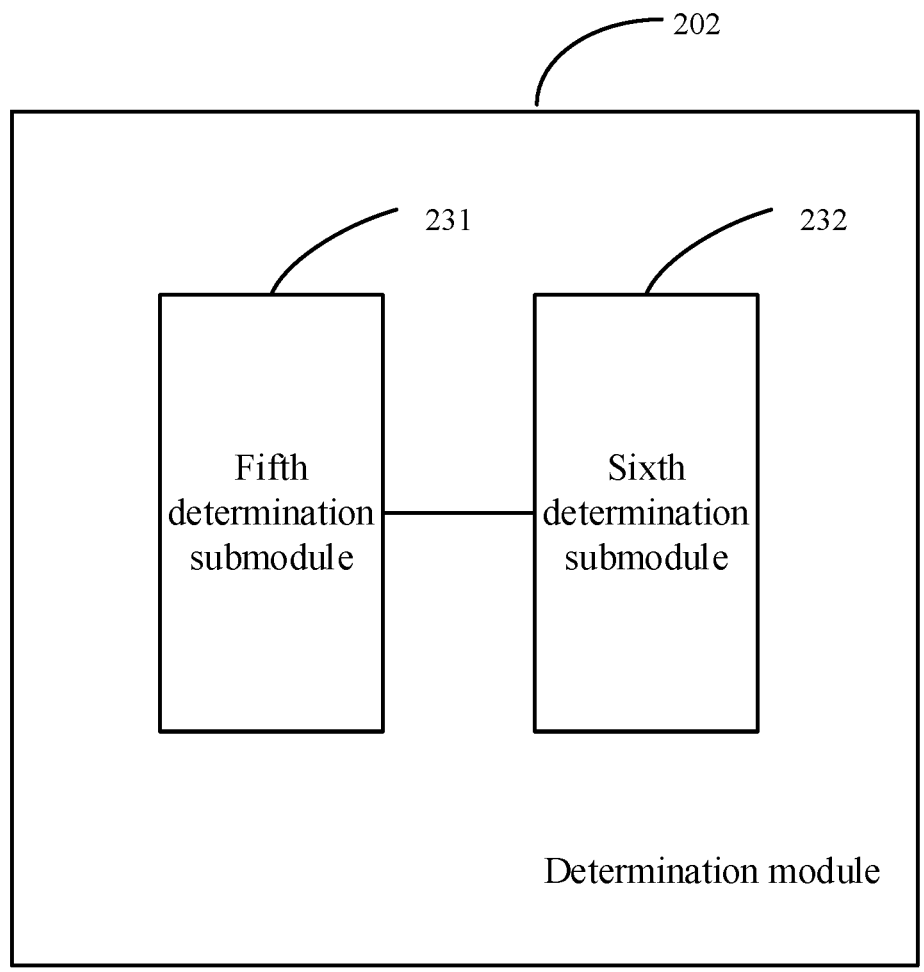
FIG. 23 is a block diagram of another cell type indication device according to some embodiments of the present disclosure.

In some embodiments, based on the device shown in FIG. 20, as shown in FIG. 23, the determination portion 202 may include:

a fifth determination subportion 231, configured to, if the system message includes a first TAC representing that the first cell is the cell providing dedicated network service for high-speed railway, determine that the first cell is the cell providing dedicated network service for high-speed railway; and a sixth determination subportion 232, configured to, if the system message does not include the first TAC, determine that the first cell is the cell providing common public network service for LTE.

It can be seen from the embodiment that the first TAC may represent that the first cell is the cell providing dedicated network service for high-speed railway; if the system message includes the first TAC representing that the first cell is the cell providing dedicated network service for high-speed railway, it is determined that the first cell is the cell providing dedicated network service for high-speed railway; and if the system message does not include the first TAC, it is determined that the first cell is the cell providing common public network service for LTE. Therefore, the cell type indication reliability is improved, and the cell type determination efficiency is further improved.

Figure 24:
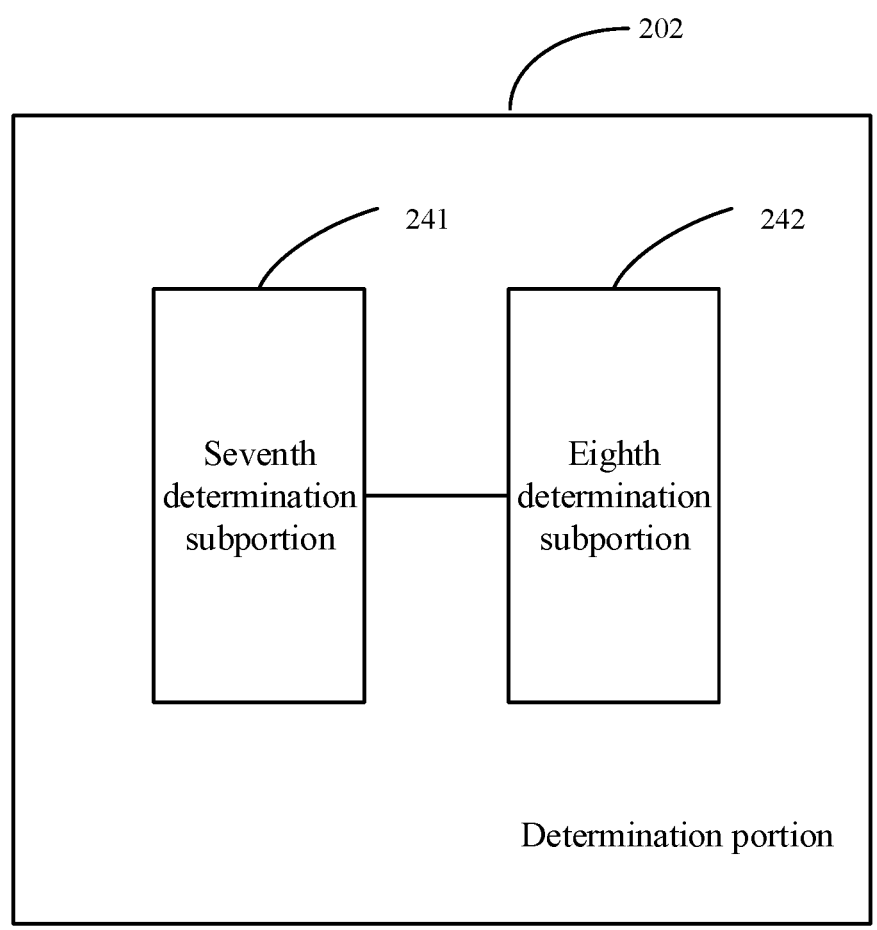
FIG. 24 is a block diagram of another cell type indication device according to some embodiments of the present disclosure.

In some embodiments, based on the device shown in FIG. 20, as shown in FIG. 24, the determination portion 202 may include:

a seventh determination subportion 241, configured to, if the system message includes a third information element and the third information element includes a second TAC representing that the first cell is the cell providing dedicated network service for high-speed railway, determine that the first cell is the cell providing dedicated network service for high-speed railway; and an eighth determination subportion 242, configured to, if the system message includes the third information element and the third information element does not include the second TAC, the third information element representing that the first cell is the cell providing common public network service for LTE when the third information element does not include the second TAC, determine that the first cell is the cell providing common public network service for LTE.

It can be seen from the embodiment that the second TAC is configured to represent that the first cell is the cell providing dedicated network service for high-speed railway; if the system message includes the third information element and the third information element includes the second TAC representing that the first cell is the cell providing dedicated network service for high-speed railway, it is determined that the first cell is the cell providing dedicated network service for high-speed railway; and if the system message includes the third information element and the third information element does not include the second TAC, the third information element representing that the first cell is the cell providing common public network service for LTE when the third information element does not include the second TAC, it is determined that the first cell is the cell providing common public network service for LTE. Therefore, the cell type indication reliability is improved, and the cell type determination efficiency is further improved.

In some embodiments, based on the device shown in FIG. 20, the system message is specifically a SIB1.

Figure 25:
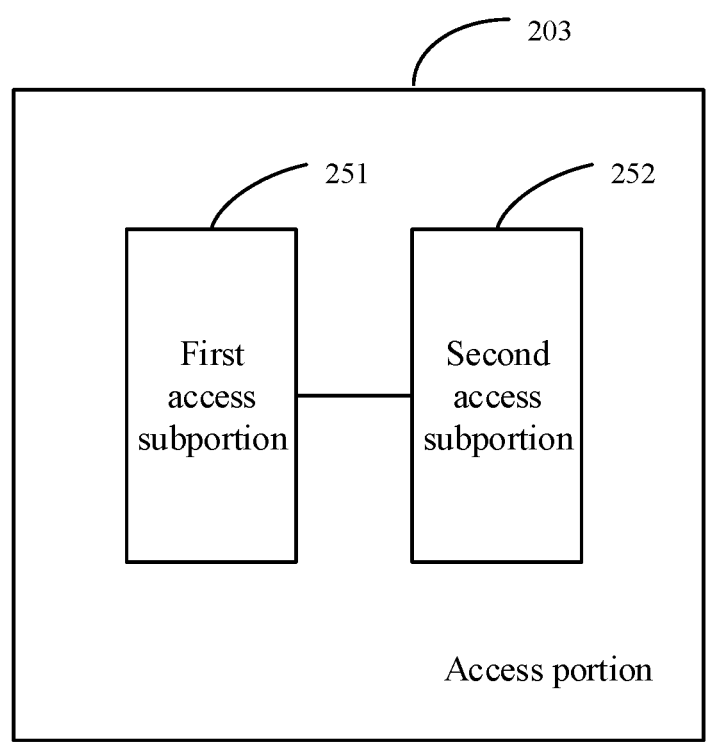
FIG. 25 is a block diagram of another cell type indication device according to some embodiments of the present disclosure.

In some embodiments, based on the device shown in FIG. 20, as shown in FIG. 25, the determination portion 202 may include:

a first access subportion 251, configured to, in response to that the first cell is the cell providing dedicated network service for high-speed railway and a movement speed of the terminal is higher than a first speed threshold value, determine to access the first cell and initiate the access process to the first cell; and a second access subportion 252, configured to, in response to that the first cell is the cell providing common public network service for LTE and the movement speed of the terminal is lower than a second speed threshold value, the second speed threshold value being less than or equal to the first speed threshold value, determine to access the first cell and initiate the access process to the first cell.

It can be seen from the embodiment that, in response to that the first cell is the cell providing dedicated network service for high-speed railway and the movement speed of the terminal is higher than the first speed threshold value, it is determined that access to the first access is required and an access process to the first cell is initiated; and in response to that the first cell is the cell providing common public network service for LTE and the movement speed of the terminal is lower than the second speed threshold value, the second speed threshold value being less than or equal to the first speed threshold value, it is determined that access to the first cell is required and an access process to the first cell is initiated. Therefore, a proper cell may be selected for access according to the cell type, and the cell access efficiency is improved.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the portions therein may be selected according to a practical requirement to achieve the purpose of the solutions of the present disclosure. Those of general skill in the art may understand and implement without creative work.

The present disclosure also provides a non-transitory computer-readable storage medium, in which a computer program is stored, the computer program being configured to execute any cell type indication method shown in FIG. 1 to FIG. 6.

The present disclosure also provides a non-transitory computer-readable storage medium, in which a computer program is stored, the computer program being configured to execute any cell type indication method shown in FIG. 7 to FIG. 12.

The present disclosure also provides a cell type indication device, which is applied to a base station managing a first cell and includes:

a processor; and memory configured to store an instruction executable for the processor, wherein the processor is configured to:

determine a cell type of the first cell, the cell type of the first cell including a cell providing dedicated network service for high-speed railway or a cell providing common public network service for LTE;

determine a system message to be used to indicate the cell type of the first cell; and send the system message to a terminal to enable the terminal to determine the cell type of the first cell according to the system message and, when determining to access the first cell according to the cell type of the first cell, initiate an access process to the first cell.

Figure 26:
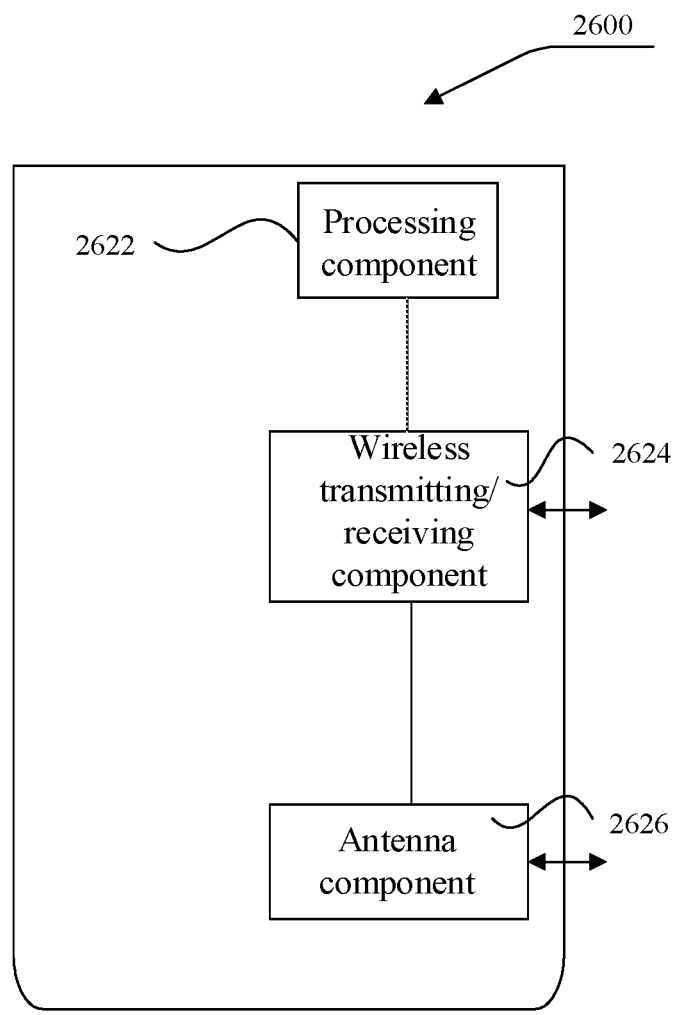
FIG. 26 is a structure diagram of a cell type indication device according to some embodiments of the present disclosure.

As shown in FIG. 26, FIG. 26 is a structure diagram of a cell type indication device according to some embodiments of the present disclosure. The device 2600 may be provided as a base station. Referring to FIG. 26, the device 2600 includes a processing component 2622, a wireless transmitting/receiving component 2624, an antenna component 2626 and a wireless interface-specific signal processing part, and the processing component 2622 may further include one or more processors.

One processor in the processing component 2622 may be configured to execute any cell type indication method.

The present disclosure also provides a cell type indication device, which is applied to a terminal and includes:
a processor; and
memory configured to store an instruction executable for the processor,
wherein the processor is configured to:
receive a system message indicating a cell type of a first cell from a base station;
determine the cell type of the first cell according to the system message, the cell type of the first cell including a cell providing dedicated network service for high-speed railway or a cell providing common public network service for LTE; and
when determining to access the first cell according to the cell type of the first cell, initiate an access process to the first cell.

Figure 27:
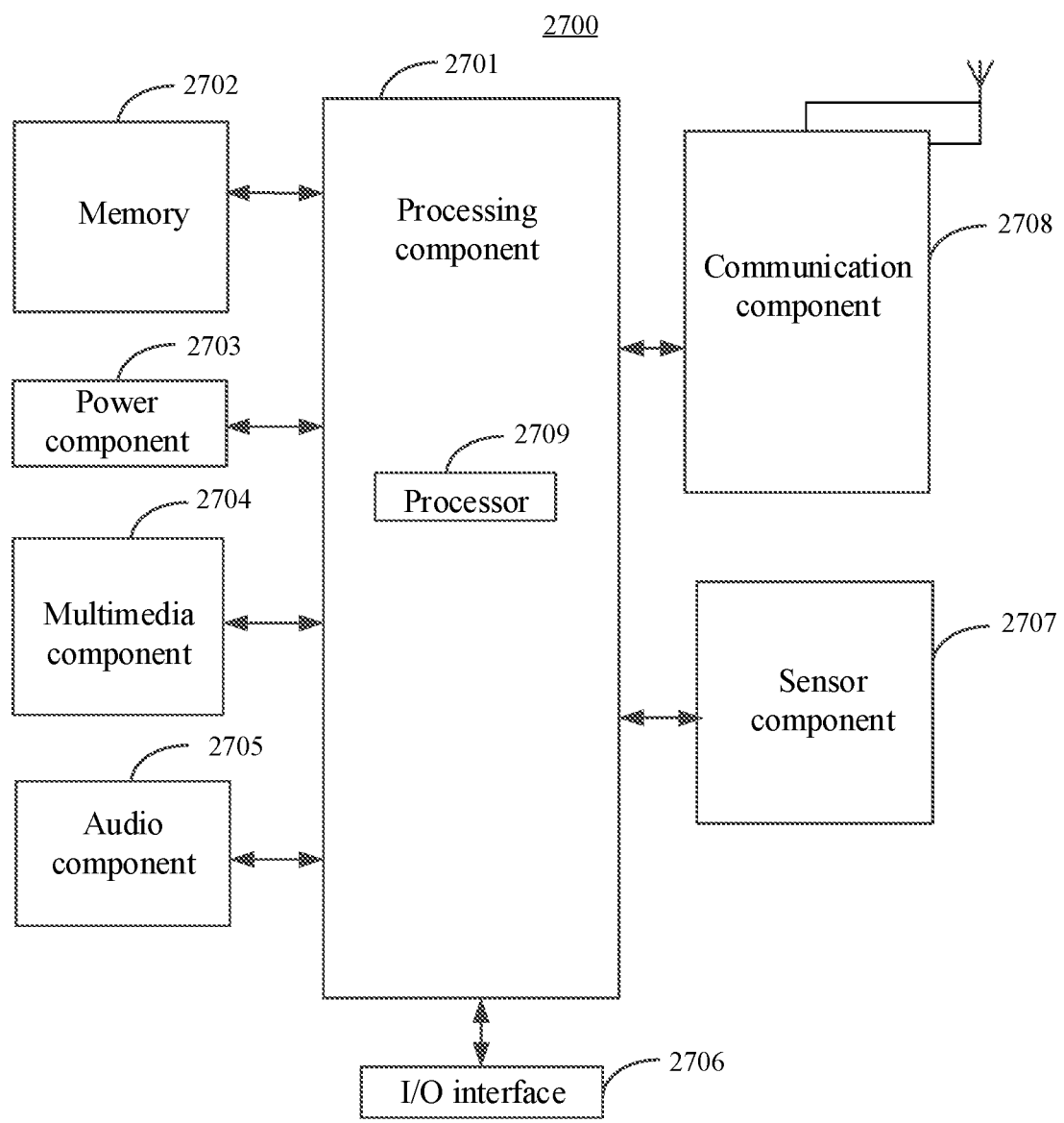
FIG. 27 is a structure diagram of a cell type indication device according to some embodiments of the present disclosure.

FIG. 27 is a structure diagram of a cell type indication device according to some embodiments of the present disclosure. FIG. 27 illustrates a cell type indication device 2700 according to some embodiments of the present disclosure. The device 2700 may be a terminal such as a computer, a mobile phone, a digital broadcast terminal, a messaging device, a gaming console, a tablet, a medical device, exercise equipment and a personal digital assistant.

Referring to FIG. 27, the device 2700 may include one or more of the following components: a processing component 2701, memory 2702, a power component 2703, a multimedia component 2704, an audio component 2705, an Input/Output (I/O) interface 2706, a sensor component 2707, and a communication component 2708.

The processing component 2701 typically controls overall operations of the device 2700, such as the operations associated with display, telephone calls, data communications, camera operations, and recording operations. The processing component 2701 may include one or more processors 2709 to execute instructions to perform all or part of the blocks in the abovementioned method. Moreover, the processing component 2701 may include one or more portions which facilitate interaction between the processing component 2701 and the other components. For instance, the processing component 2701 may include a multimedia portion to facilitate interaction between the multimedia component 2704 and the processing component 2701.

The memory 2702 is configured to store various types of data to support the operation of the device 2700. Examples of such data include instructions for any applications or methods operated on the device 2700, contact data, phonebook data, messages, pictures, video, etc. The memory 2702 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 2703 provides power for various components of the device 2700. The power component 2703 may include a power management system, one or more power supplies, and other components associated with generation, management and distribution of power for the device 2700.

The multimedia component 2704 includes a screen providing an output interface between the device 2700 and a user. In some embodiments, the screen may include a Liquid Crystal Display (LCD) and a Touch Panel (TP). In some embodiments, an organic light-emitting diode (OLED) display or other types of displays can be employed.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 2704 includes a front camera and/or a rear camera. The front camera and/or the rear camera may receive external multimedia data when the device 2700 is in an operation mode, such as a photographing mode or a video mode. Each of the front camera and the rear camera may be a fixed optical lens system or have focusing and optical zooming capabilities.

The audio component 2705 is configured to output and/or input an audio signal. For example, the audio component 2705 includes a Microphone (MIC), and the MIC is configured to receive an external audio signal when the device 2700 is in the operation mode, such as a call mode, a recording mode and a voice recognition mode. The received audio signal may further be stored in the memory 2702 or sent through the communication component 2708. In some embodiments, the audio component 2705 further includes a speaker configured to output the audio signal.

The I/O interface 2706 provides an interface between the processing component 2701 and a peripheral interface module, and the peripheral interface module may be a keyboard, a click wheel, a button and the like. The button may include, but not limited to: a home button, a volume button, a starting button and a locking button.

The sensor component 2707 includes one or more sensors configured to provide status assessment in various aspects for the device 2700. For instance, the sensor component 2707 may detect an on/off status of the device 2700 and relative positioning of components, such as a display and small keyboard of the device 2700, and the sensor component 2707 may further detect a change in a position of the device 2700 or a component of the device 2700, presence or absence of contact between the user and the device 2700, orientation or acceleration/deceleration of the device 2700 and a change in temperature of the device 2700. The sensor component 2707 may include a proximity sensor configured to detect presence of an object nearby without any physical contact. The sensor component 2707 may also include a light sensor, such as a Complementary Metal Oxide Semiconductor (CMOS) or Charge Coupled Device (CCD) image sensor, configured for use in an imaging application. In some embodiments, the sensor component 2707 may also include an acceleration sensor, a gyroscope sensor, a magnetic sensor, a pressure sensor or a temperature sensor.

The communication component 2708 is configured to facilitate wired or wireless communication between the device 2700 and another device. The device 2700 may access a communication-standard-based wireless network, such as a Wireless Fidelity (Wi-Fi) network, a 2nd-Generation (2G), 3rd-Generation (3G), 4G, or 5G network or a combination thereof. In some embodiments of the present disclosure, the communication component 2708 receives a broadcast signal or broadcast associated information from an external broadcast management system through a broadcast channel. In some embodiments of the present disclosure, the communication component 2708 further includes a Near Field Communication (NFC) module to facilitate short-range communication. For example, the NFC module may be implemented based on a Radio Frequency Identification (RFID) technology, an Infrared Data Association (IrDA)

technology, an Ultra-Wide Band (UWB) technology, a Bluetooth (BT) technology and another technology.

In some embodiments of the present disclosure, the device 2700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including an instruction, such as the memory 2702 including an instruction, and the instruction may be executed by the processor 2709 of the device 2700 to implement the abovementioned method. For example, the non-transitory computer-readable storage medium may be a ROM, a Compact Disc Read-Only Memory (CD-ROM), a magnetic tape, a floppy disc, an optical data storage device and the like.

The instruction in the storage medium is executed by the processor to enable the device 2700 to execute any cell type indication method.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A cell type indication method, applied to a base station managing a first cell, the method comprising:
    determining a cell type of the first cell, the cell type of the first cell comprising a cell providing dedicated network service for high-speed railway or a cell providing common public network service for Long-Term Evolution (LTE);
    determining a system message to be used to indicate the cell type of the first cell, wherein the system message is System Information Block 1 (SIB1);
    generating a first information element, the first information element representing that the cell type is the cell providing dedicated network service for high-speed railway;
    in response to that the cell type of the first cell is the cell providing dedicated network service for high-speed railway, adding the first information element to the system message;
    in response to that the cell type of the first cell is the cell providing common public network for LTE, not adding the first information element to the system message; and
    sending the system message for indicating the cell type of the first cell to a terminal to enable the terminal to initiate an access process to the first cell according to the cell type.

2. A cell type indication method, applied to a terminal and comprising:
    receiving a system message indicating a cell type of a first cell from a base station, wherein the system message is System Information Block 1 (SIB1);
    determining the cell type of the first cell according to the system message, the cell type of the first cell comprising a cell providing dedicated network service for high-speed railway or a cell providing common public network for Long-Term Evolution (LTE);
    in response to that the system message comprises a first information element, and the first information element representing that the first cell is the cell providing dedicated network service for high-speed railway, determining that the first cell is the cell providing dedicated network service for high-speed railway;
    in response to that the system message does not comprise the first information element, determining that the first cell is the cell providing common public network for LTE; and
    in response to determining to access the first cell according to the cell type of the first cell, initiating an access process to the first cell.

3. The method of claim 2, wherein in response to determining to access the first cell according to the cell type of the first cell, initiating an access process to the first cell comprises:
    in response to determining that the first cell is the cell providing dedicated network service for high-speed railway and a movement speed of the terminal is higher than a first speed threshold value, determining to access the first cell, and initiating access to the first cell; and
    in response to determining that the cell type of the first cell is the cell providing common public network for LTE and the movement speed of the terminal is lower than a second speed threshold value, the second speed threshold value being less than or equal to the first speed threshold value, determining to access the first cell, and initiating the access process to the first cell.

4. A base station implementing the method of claim 1, comprising:
    a processor; and
    memory configured to store an instruction executable for a processor,
    wherein the processor is configured to perform operations the method.

5. A terminal, comprising:
    a processor; and
    memory configured to store an instruction executable for a processor,
    wherein the processor is configured to:
    receive a system message indicating a cell type of a first cell from a base station, wherein the system message is System Information Block 1 (SIB1);
    determine the cell type of the first cell according to the system message, the cell type of the first cell comprising a cell providing dedicated network service for high-speed railway or a cell providing common public network service for Long-Term Evolution (LTE);
    in response to that the system message comprises a first information element, and the first information element representing that the first cell is the cell providing dedicated network service for high-speed railway, determining that the first cell is the cell providing dedicated network service for high-speed railway;
    in response to that the system message does not comprise the first information element, determining that the first cell is the cell providing common public network for LTE; and
    in response to determining to access the first cell according to the cell type of the first cell, initiate an access process to the first cell.

6. The terminal of claim 5, wherein in initiating the access process to the first cell in response to determining to access the first cell according to the cell type of the first cell, the processor is configured to:
    in response to that the first cell is the cell providing dedicated network service for high-speed railway and a movement speed of the terminal is higher than a first speed threshold value, determine to access the first cell, and initiate an access process to the first cell; and
    in response to that the first cell is the cell providing common public network for LTE and the movement speed of the terminal is lower than a second speed threshold value, the second speed threshold value being less than or equal to the first speed threshold value, determine to access the first cell, and initiate the access process to the first cell.

7. A high-speed railway communication system implementing the method of claim 1, comprising the base station and the terminal, wherein the terminal is configured to:
    receive the system message indicating the cell type of the first cell from the base station;
    determine the cell type of the first cell according to the system message indicating the cell type of the first cell, the cell type of the first cell including the cell providing dedicated network service for high-speed railway or the cell providing common public network service for LTE; and determine to access the first cell according to the cell type of the first cell, and initiate an access process to the first cell, such that a proper cell is selected for access according to the cell type, and improve cell access accuracy.

* * * * *